United States Patent
Zhang et al.

(10) Patent No.: US 11,800,172 B2
(45) Date of Patent: Oct. 24, 2023

(54) TERMINAL DEVICE, METHOD AND SYSTEM FOR REALIZING ONE-TOUCH SCREEN PROJECTION THROUGH REMOTE CONTROL

(71) Applicant: Honor Device Co., Ltd., Shenzhen (CN)

(72) Inventors: Jinming Zhang, Shenzhen (CN); Yuren Xiao, Shenzhen (CN); Liping Wang, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 4 days.

(21) Appl. No.: 17/632,826

(22) PCT Filed: Aug. 4, 2020

(86) PCT No.: PCT/CN2020/106708
§ 371 (c)(1),
(2) Date: Feb. 4, 2022

(87) PCT Pub. No.: WO2021/027616
PCT Pub. Date: Feb. 18, 2021

(65) Prior Publication Data
US 2022/0272399 A1   Aug. 25, 2022

(30) Foreign Application Priority Data

Aug. 9, 2019 (CN) .......................... 201910735941.2
May 8, 2020 (CN) .......................... 202010381287.2

(51) Int. Cl.
*H04B 7/00* (2006.01)
*H04N 21/41* (2011.01)
(Continued)

(52) U.S. Cl.
CPC ... *H04N 21/4122* (2013.01); *H04N 21/42221* (2013.01); *H04W 4/80* (2018.02)

(58) Field of Classification Search
CPC ................ H04W 4/80; H04N 21/4122; H04N 21/42221; H04B 5/00; H04B 5/0062
See application file for complete search history.

(56) References Cited

U.S. PATENT DOCUMENTS 9,628,570 B2   4/2017   Park et al.
10,032,431 B2   7/2018   Wilde et al.
(Continued)

FOREIGN PATENT DOCUMENTS

CN   103687061 A   3/2014
CN   103997688 A   8/2014
(Continued)

OTHER PUBLICATIONS

Nagasawa, T. et al., "Tap to Display, Wireless Display Connection on Mobile Devices Triggered by NFC Tag", IEEE 3rd Global Conference on Consumer Electronics (GCCE), 3 Pages, Oct. 7, 2014.
(Continued)

*Primary Examiner* — Tuan Pham
(74) *Attorney, Agent, or Firm* — Slater Matsil, LLP

(57) ABSTRACT

A method, a terminal device, and a system for implementing a one-touch screen projection function. The method includes: obtaining, by the terminal device through an NFC tag of a remote control, device identification information of a display device and tag information that are stored in the remote control; and initiating, by the terminal device, a connection with the display device by using the obtained device identification information and tag information, and implementing a screen projection function by using the Miracast protocol or the DLNA protocol.

19 Claims, 26 Drawing Sheets

(51) Int. Cl.
*H04W 4/80* (2018.01)
*H04N 21/422* (2011.01)

(56) References Cited

U.S. PATENT DOCUMENTS

| | | | |
|---|---|---|---|
| 10,490,061 B2* | 11/2019 | Guihot | G08C 17/00 |
| 10,674,339 B2* | 6/2020 | Sueyoshi | H04W 84/10 |
| 11,025,855 B2* | 6/2021 | Jeong | H04N 21/42204 |
| 2013/0005250 A1 | 1/2013 | Kim et al. | |
| 2013/0027613 A1 | 1/2013 | Kim et al. | |
| 2013/0267168 A1 | 10/2013 | Jeon et al. | |
| 2014/0141721 A1* | 5/2014 | Kim | H04M 1/72412 455/41.2 |
| 2014/0150010 A1 | 5/2014 | Jeon et al. | |
| 2014/0194063 A1 | 7/2014 | Bahadirov | |
| 2014/0259061 A1* | 9/2014 | Delpuch | H04W 88/16 725/37 |
| 2014/0310742 A1 | 10/2014 | Kim et al. | |
| 2015/0147961 A1 | 5/2015 | Britt, Jr. et al. | |
| 2015/0161477 A1 | 6/2015 | Kashyap et al. | |
| 2016/0080708 A1 | 3/2016 | Urata et al. | |
| 2016/0182613 A1 | 6/2016 | Brune et al. | |
| 2017/0011624 A1 | 1/2017 | Guihot et al. | |

FOREIGN PATENT DOCUMENTS

| | | |
|---|---|---|
| CN | 104301012 A | 1/2015 |
| CN | 105187871 A | 12/2015 |
| CN | 105191249 A | 12/2015 |
| CN | 105681877 A | 6/2016 |
| CN | 106502604 A | 3/2017 |
| CN | 107635262 A | 1/2018 |
| CN | 109981907 A | 7/2019 |
| CN | 109996101 A | 7/2019 |
| JP | 2013114432 A | 6/2013 |
| JP | 2016019277 A | 2/2016 |
| JP | 2017208816 A | 11/2017 |
| KR | 20130021712 A | 3/2013 |
| RU | 2619889 C2 | 5/2017 |
| RU | 2625952 C2 | 7/2017 |
| WO | 2018024012 A1 | 2/2018 |

OTHER PUBLICATIONS

Nagasawa, T. et al., "Tap to Display, wireless display connection on mobile devices triggered by NFC tag", 2014 IEEE 3rd Global Conference on Consumer Electronics (GCCE), Oct. 7, 2014, pp. 452-454.

Yin, C., "Touching the simple and fast life, NFC has given birth to a new way of smart home interaction", (with partial English translation), Integrated Circuit Applications, Feb. 2013, pp. 36-38.

Feng, W., "Research on the Value of Home Internet Terminals", (with partial English translation), Post and Telecommunications Design Technology, Mar. 2018, pp. 6-11.

Opperman, C.A. et al., "Using NFC-enabled Phones for Remote Data Acquisition and Digital Control," IEEE Africon 2011, The Falls Resort and Conference Centre, Livingstone, Zambia, Sep. 13-15, 2011, 6 pages.

* cited by examiner

TERMINAL DEVICE, METHOD AND SYSTEM FOR REALIZING ONE-TOUCH SCREEN PROJECTION THROUGH REMOTE CONTROL

This application is a national stage of International Application No. PCT/CN2020/106708, filed on Aug. 4, 2020, which claims priority to Chinese Patent Application No. 202010381287.2, filed on May 8, 2020, and claims priority to Chinese Patent Application No. 201910735941.2, filed on Aug. 9, 2019. All the aforementioned applications are hereby incorporated by reference in their entireties.

TECHNICAL FIELD

This application relates to the field of short-range communication, and in particular, to the field of NFC screen projection.

BACKGROUND

Near-field communication (Near-field communication, NFC) is a short-range wireless communication technology based on a 13.56 megahertz (MHz) carrier frequency, and allows non-contact point-to-point data transmission between devices. Due to its high security, the NFC has gained a growing popularity and public recognition in recent years. Development of NFC-enabled terminals is particularly rapid. The NFC-enabled terminals may work in three modes: reader/writer mode, card emulation mode, and point-to-point mode. Now it is increasingly common to read a tag in reader/writer mode, so as to use an application.

The reader/writer mode in NFC can be triggered without bringing an application to the foreground first when a screen of a mobile phone is lit up. At present, an existing tag technology enables a direct connection upon a touch by the mobile phone, without a user performing cumbersome operations. In addition, after the touch, it can be determined that the mobile phone is connected to an Internet of things (Internet of Things, IOT) device.

SUMMARY

This application provides a one-touch screen projection method, an electronic device, and a system, to help improve operation efficiency of a user and an intelligence degree of an electronic device, and improve user experience.

According to a first aspect, a screen projection system is provided. The system includes a remote control, a terminal device, and a display device. The remote control is configured to: the remote control includes an NFC tag, where the NFC tag stores first information, and the first information includes device identification information of the display device and an identification code of the NFC tag. The terminal device is configured to: the terminal device has an NFC function; obtain the first information at a touch of the NFC tag of the remote control; initiate a first request to the display device when the first information is not recorded in the terminal device; receive a first response message from the display device; determine, based on the first response message, that the display device is a usable device; and receive a first operation of a user and establish a screen projection connection with the display device. Touching the remote control to implement one-touch screen projection is more convenient in operation.

With reference to the first aspect, in a first design, the screen projection connection includes a connection based on the Miracast protocol or the DLNA protocol. With the existing protocol, the operation is more convenient.

With reference to the first aspect, in a second design, the terminal device is further configured to send a second connection request to the display device, so as to request to establish a P2P connection to implement screen projection.

With reference to the first aspect, in a third design, the display device is further configured to display a first prompt message when receiving the second connection request from the terminal device, where the first prompt message is used to prompt the user to accept or reject the second connection request; and receive a second operation of the user and establish a screen projection connection with the terminal device. In this way, the user can be prompted to accept or reject the connection request.

With reference to the first aspect, in a fourth design, the terminal device is further configured to send a third connection request to the display device when the first information is recorded in the terminal device, where the third connection request is used to establish a screen projection service with the display device. If a connection has once been established, this design can reduce steps, thereby saving power and improving user experience.

With reference to the first aspect, in a fifth design, the terminal device is further configured to display the identification of the display device in response to the first response message. In this way, the user can be informed of a currently usable display device.

With reference to the first aspect, in a fifth design, the terminal device is further configured to display a first window at a touch of the NFC tag of the remote control, where the first window includes the identification information of the display device. In this way, the user can be informed of information about the remote control, improving user experience.

According to a second aspect, a screen projection system method is provided. The method includes:

obtaining, by a first electronic device, first information when the first electronic device touches a second electronic device, where the first information includes identification information of the second electronic device and identification information of a third electronic device, and the second electronic device is associated with the third electronic device; sending, by the first electronic device, a first request to the third electronic device, where the first request is used for the first electronic device to request to establish a screen projection connection with the third electronic device; displaying, by the third device, first prompt information in response to the first request, where the first prompt information is used to prompt a user to reject or accept the first request; and receiving, by the third device, a first operation of the user, and establishing a screen projection connection with the first electronic device. Touching the remote control to implement one-touch screen projection is more convenient in operation.

With reference to the second aspect, in a first design, the screen projection connection includes a connection based on the Miracast protocol or the DLNA protocol. With the existing protocol, the operation is more convenient.

With reference to the second aspect, in a second design, the first electronic device and the second electronic device both have an NFC function.

With reference to the second aspect, in a third design, an NFC tag is installed in the second electronic device.

With reference to the second aspect, in a fourth design, the identification information of the second electronic device or the identification information of the third electronic device includes at least one of the following: a device name, a device type, MAC address information, an identification code, manufacturer information, and a screen projection parameter.

According to a third aspect, this application further provides an electronic device. The electronic device includes: one or more processors, a memory, multiple application programs, and one or more computer programs, where the one or more computer programs are stored in the memory, the one or more computer programs include instructions, and when the instructions are executed by the electronic device, the electronic device is caused to perform the following operations: obtaining first information when the electronic device touches a second electronic device, where the first information includes identification information of the second electronic device and identification information of a third electronic device, and the second electronic device is associated with the third electronic device; sending a first request to the third electronic device, where the first request is used for the electronic device to request to establish a screen projection connection with the third electronic device; and establishing, by the electronic device, a screen projection connection with the third electronic device. Touching the remote control to implement one-touch screen projection is more convenient in operation.

With reference to the third aspect, in a first design, the screen projection connection includes a connection based on the Miracast protocol or the DLNA protocol. With the existing protocol, the operation is more convenient.

With reference to the third aspect, in a second design, the electronic device and the second electronic device both have an NFC function.

With reference to the third aspect, in a third design, an NFC function and WLAN of the electronic device are both enabled.

With reference to the third aspect, in a fourth design, the electronic device further performs the following: receiving a first response message before establishing a screen projection connection with the third electronic device, where the first response is used to indicate that the third electronic device has received the first request; and establishing a screen projection connection with the third electronic device in response to the first response.

With reference to the third aspect, in a fifth design, the electronic device further performs the following: displaying a first prompt box when the first information is obtained, where the prompt box includes the identification information of the third electronic device.

With reference to the third aspect, in a sixth design, the electronic device further performs the following: displaying a second prompt box in response to the touch operation when a WLAN function of the electronic device is disabled, where the second prompt box is used to prompt the user whether to enable the WLAN function.

According to a fourth aspect, a technical solution provides an apparatus. The apparatus is included in an electronic device. The apparatus can implement the behaviors of the electronic device in the foregoing aspects and the possible embodiments of the foregoing aspects. The functions may be implemented by hardware, or may be implemented by hardware executing corresponding software. The hardware or software includes one or more modules or units corresponding to the functions.

According to a fifth aspect, a technical solution provides an electronic device including one or more processors, a memory, multiple application programs, and one or more computer programs. The one or more computer programs are stored in the memory, and the one or more computer programs include instructions. When the instructions are executed by the electronic device, the electronic device is caused to perform the method in any one of the possible embodiments of any one of the foregoing aspects.

According to a sixth aspect, a technical solution provides an electronic device, including one or more processors and one or more memories. The one or more memories are coupled to the one or more processors. The one or more memories are configured to store computer program code. The computer program code includes computer instructions. When the one or more processors execute the computer instructions, the electronic device is caused to perform the one-touch screen projection method in any of the possible embodiments of any one of the foregoing aspects.

According to a seventh aspect, a technical solution provides a computer storage medium, including computer instructions. When the computer instructions run on an electronic device, the electronic device is caused to perform the one-touch screen projection method in any one of the possible embodiments of any one of the foregoing aspects.

According to an eighth aspect, a technical solution provides a computer program product. When the computer program product runs on an electronic device, the electronic device is caused to perform the one-touch screen projection method in any one of the possible designs of any one of the foregoing aspects.

According to a ninth aspect, a technical solution provides a chip system, including a processor, configured to call and run a computer program from a memory, so that an electronic device on which the chip system is installed performs the method according to the first aspect, the second aspect, or the third aspect, or any design of the first aspect, the second aspect, or the third aspect. Optionally, the chip system further includes the memory.

According to a tenth aspect, this application further provides a remote control. The remote control includes an NFC tag and a processor. The NFC tag stores device information of a display device paired with the remote control, and the NFC tag has a unique identification code. Storing the identification information of the display device in the remote control can implement screen projection more quickly.

DETAILED DESCRIPTION OF THE EMBODIMENTS

Figure 1:
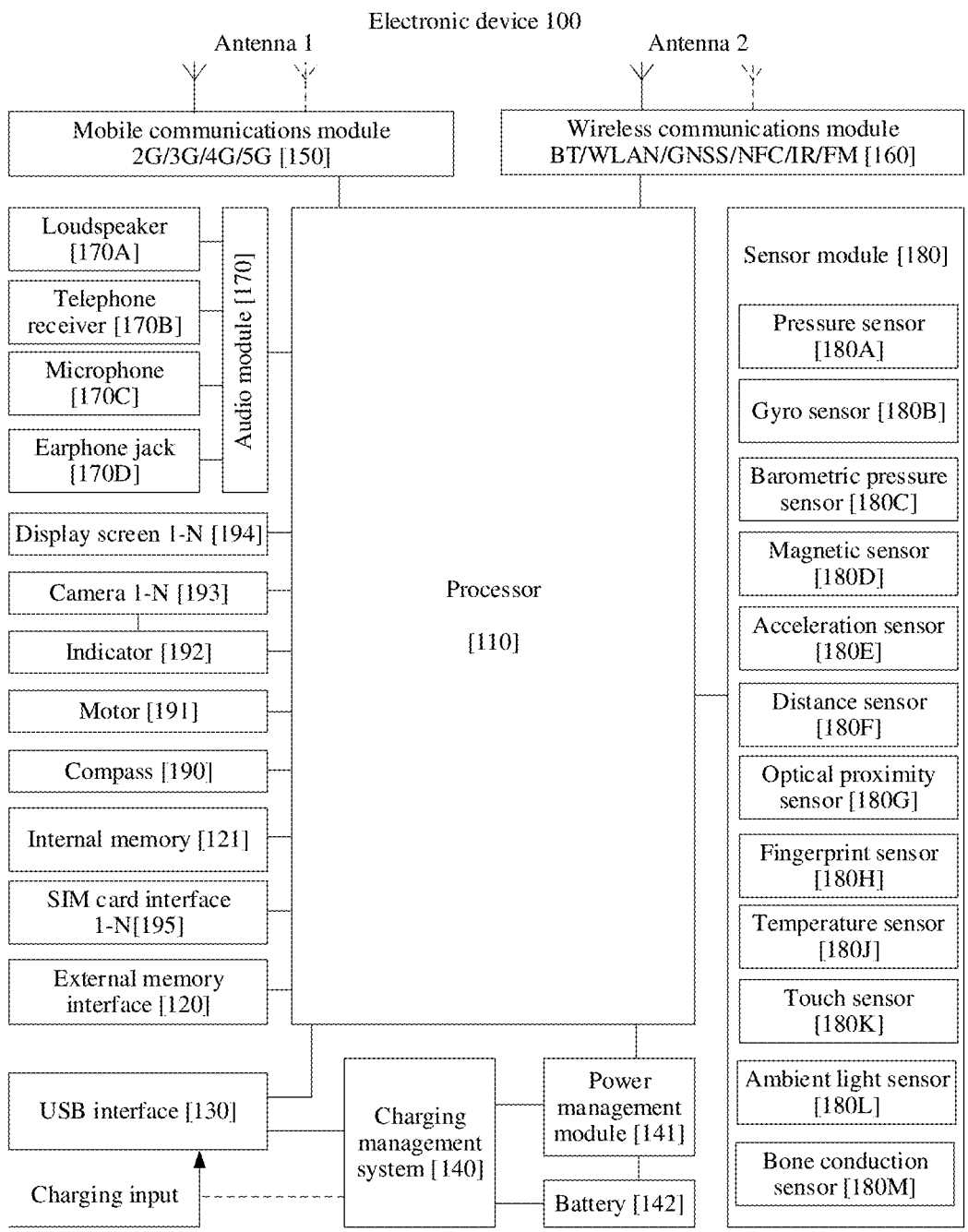
FIG. 1 is a first schematic diagram of a terminal device according to an embodiment of this application.

As shown in FIG. 1, FIG. 1 is a first schematic structural diagram of a terminal device 100.

The terminal device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a loudspeaker 170A, a telephone receiver 170B, a microphone 170C, an earphone jack 170D, a sensor module 180, a key 190, a motor 191, an indicator 192, a camera 193, a display screen 194, a subscriber identification module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It can be understood that the structure illustrated in this embodiment of the present invention does not constitute a specific limitation on the terminal device 100. In some other embodiments of this application, the terminal device 100 may include more or fewer components than those shown in the figure, or combine some of the components, split some of the components, or arrange the components differently. The illustrated components may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, a neural-network processing unit (neural-network processing unit, NPU), and/or the like. Different processing units may be separate devices or integrated into one or more processors.

The controller may generate an operation control signal according to an instruction operation code and a timing signal, to control instruction fetch and instruction execution.

A memory may be further provided in the processor 110 to store instructions and data. In some embodiments, the memory in the processor 110 is a cache memory. The memory may store instructions or data that the processor 110 has just used or used cyclically. If the processor 110 needs to use the instructions or data again, the processor may directly call the instructions or data from the memory, thereby avoiding repeated access, reducing waiting time of the processor 110, and improving system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a bidirectional synchronous serial bus and includes a serial data line (serial data line, SDA) and a serial clock line (derail clock line, SCL). In some embodiments, the processor 110 may include multiple I2C buses. The processor 110 may be coupled to the touch sensor 180K, a charger, a flash, the camera 193, and the like by using different I2C bus interfaces. For example, the processor 110 may be coupled to the touch sensor 180K by using the I2C interface, so that the processor 110 and the touch sensor 180K communicate through the I2C bus interface to implement a touch function of the terminal device 100.

The I2S interface may be used for audio communication. In some embodiments, the processor 110 may include multiple I2S buses. The processor 110 may be coupled to the audio module 170 by using an I2S bus to implement communication between the processor 110 and the audio module 170. In some embodiments, the audio module 170 may transmit an audio signal to the wireless communications module 160 through the I2S interface, so as to implement a function of answering calls through a Bluetooth earphone.

The PCM interface may also be used for audio communication to sample, quantize, and encode an analog signal. In some embodiments, the audio module 170 and the wireless communications module 160 may be coupled by using a PCM bus interface. In some embodiments, the audio module 170 may also transmit an audio signal to the wireless communications module 160 through the PCM interface, so as to implement a function of answering calls through a Bluetooth earphone. Both the I2S interface and the PCM interface may be used for audio communication.

The UART interface is a universal serial data bus used for asynchronous communication. The bus may be a two-way communications bus. It converts to-be-transmitted data between serial communication and parallel communication. In some embodiments, the UART interface is generally configured to connect the processor 110 with the wireless communications module 160. For example, the processor 110 communicates with a Bluetooth module of the wireless communications module 160 through the UART interface, to implement a Bluetooth function. In some embodiments, the audio module 170 may transmit an audio signal to the wireless communications module 160 through the UART interface, so as to implement a function of playing music through a Bluetooth earphone.

The MIPI interface may be configured to connect the processor 110 with the display screen 194, the camera 193, and other peripheral devices. The MIPI interface includes a camera serial interface (camera serial interface, CSI), a display serial interface (display serial interface, DSI), and the like. In some embodiments, the processor 110 and the camera 193 communicate through the CSI interface to implement a shooting function of the terminal device 100. The processor 110 and the display screen 194 communicate through a DSI interface to implement a display function of the terminal device 100.

The GPIO interface may be configured through software. The GPIO interface may be configured as a control signal or a data signal. In some embodiments, the GPIO interface may be configured to connect the processor 110 with the camera 193, the display screen 194, the wireless communications module 160, the audio module 170, the sensor module 180, and the like. The GPIO interface may alternatively be configured as an I2C interface, an I2S interface, a UART interface, an MIPI interface, or the like.

The USB interface 130 is an interface that complies with the USB standard specification, and specifically may be a Mini USB interface, a Micro USB interface, a USB Type C interface, or the like. The USB interface 130 may be configured to connect a charger to charge the terminal device 100, may also be configured to transmit data between the terminal device 100 and a peripheral device, and may also be configured to connect to an earphone, so as to play audio through the earphone. This interface may also be configured to connect to another terminal device, such as an AR device.

It can be understood that the interface connection relationship between the modules illustrated in this embodiment of the present invention is merely illustrative, and does not constitute a structural limitation on the terminal device 100. In some other embodiments of this application, the terminal device 100 may alternatively adopt an interface connection mode different from the foregoing embodiment, or a combination of multiple interface connection modes.

The charging management module 140 is configured to receive charging input from a charger. The charger may be a wireless charger or a wired charger. In some wired charging embodiments, the charging management module 140 may receive charging input from a wired charger through the USB interface 130. In some wireless charging embodiments, the charging management module 140 may receive wireless charging input through a wireless charge coil of the terminal device 100. The charging management module 140 may also supply power to the terminal device through the power management module 141 while charging the battery 142.

The power management module 141 is configured to connect to the battery 142, the charging management module 140, and the processor 110. The power management module 141 receives input from the battery 142 and/or the charging management module 140, to supply power to the processor 110, the internal memory 121, the display screen 194, the camera 193, the wireless communications module 160, and the like. The power management module 141 may also be configured to monitor parameters such as a battery capacity, a quantity of battery cycles, and a battery health status (electric leakage and impedance). In some other embodiments, the power management module 141 may alternatively be provided in the processor 110. In some other embodiments, the power management module 141 and the charging management module 140 may alternatively be provided in a same device.

A wireless communication function of the terminal device 100 may be implemented by using the antenna 1, the antenna 2, the mobile communications module 150, the wireless communications module 160, the modem processor, the baseband processor, and the like.

The antenna 1 and the antenna 2 are configured to transmit and receive an electromagnetic wave signal. Each antenna of the terminal device 100 may be configured to cover one or more communication bands. Different antennas may also be multiplexed to improve antenna utilization. For example, the antenna 1 may be multiplexed as a diversity antenna of a wireless local area network. In some other embodiments, the antenna may be used in combination with a tuning switch.

The mobile communications module 150 may provide a wireless communication solution including 2G/3G/4G/5G and the like to be applied to the terminal device 100. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering and amplification on the received electromagnetic wave, and then transmit the processed electromagnetic wave to the modem processor for demodulation. The mobile communications module 150 may also amplify a signal modulated by the modem processor, and convert it into an electromagnetic wave through the antenna 1 for transmission. In some embodiments, at least some of functional modules of the mobile communications module 150 may be provided in the processor 110. In some embodiments, at least some of functional modules of the mobile communications module 150 and at least some of modules of the processor 110 may be provided in a same device.

The modem processor may include a modulator and a demodulator. The modulator is configured to modulate a to-be-sent low frequency baseband signal into a medium or high frequency signal. The demodulator is configured to demodulate a received electromagnetic wave signal into a low frequency baseband signal. Then the demodulator transmits the demodulated low frequency baseband signal to a baseband processor for processing. The low frequency baseband signal is transferred to an application processor after being processed by the baseband processor. The application processor outputs a sound signal through an audio device (not limited to the loudspeaker 170A, the telephone receiver 170B, and the like), or displays an image or a video through the display screen 194. In some embodiments, the modem processor may be a separate component. In some other embodiments, the modem processor may be independent of the processor 110 and provided in a same device together with the mobile communications module 150 or another functional module.

The wireless communications module 160 may provide wireless communication solutions such as a wireless local area network (wireless local area networks, WLAN) (for example, a wireless fidelity (wireless fidelity, Wi-Fi) network), Bluetooth (bluetooth, BT), a global navigation satellite system (global navigation satellite system, GNSS), frequency modulation (frequency modulation, FM), a near field communication technology (near field communication, NFC), and an infrared technology (infrared, IR) to be applied on the terminal device 100. The wireless communications module 160 may be one or more devices integrated with at least one communication processing module. The wireless communications module 160 receives an electromagnetic wave through the antenna 2, performs frequency modulation and filtering on the electromagnetic wave signal, and sends the processed signal to the processor 110. The wireless communications module 160 may also receive a to-be-sent signal from the processor 110, perform frequency modulation and amplification on the signal, and convert it into an electromagnetic wave through the antenna 2 for transmission.

In some embodiments, the antenna 1 of the terminal device 100 is coupled to the mobile communications module 150, and the antenna 2 is coupled to the wireless communications module 160, so that the terminal device 100 can communicate with a network and another device by using a wireless communications technology. The wireless communications technology may include global system for mobile communications (global system for mobile communications, GSM), general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, GNSS, WLAN, NFC, FM, IR technology, and/or the like. The GNSS may include the global positioning system (global positioning system, GPS), the global navigation satellite system (global navigation satellite system, GLONASS), the Beidou navigation satellite system (beidou navigation satellite system, BDS), the quasi-zenith satellite system (quasi-zenith satellite system, QZSS), and/or satellite based augmentation systems (satellite based augmentation systems, SBAS).

The terminal device 100 implements a display function by using a GPU, the display screen 194, an application processor, and the like. The GPU is an image processing microprocessor, and is connected to the display screen 194 and the application processor. The GPU is configured to perform mathematical and geometric calculation for graphics rendering. The processor 110 may include one or more GPUs that execute program instructions to generate or change displayed information.

The display screen 194 is configured to display an image, a video, and the like. The display screen 194 includes a display panel. The display panel may be a liquid crystal display (liquid crystal display, LCD), an organic light-emitting diode (organic light-emitting diode, OLED), an active-matrix organic light emitting diode or active-matrix organic light emitting diode (active-matrix organic light emitting diode, AMOLED), a flexible light-emitting diode (flex light-emitting diode, FLED), Miniled, MicroLed, Micro-oLed, a quantum dot light emitting diode (quantum dot light emitting diodes, QLED), or the like. In some embodiments, the terminal device 100 may include one or N display screens 194, where N is a positive integer greater than 1.

The terminal device 100 may implement a shooting function by using the ISP, the camera 193, the video codec, the GPU, the display screen 194, an application processor, and the like.

The ISP is configured to process data fed back by the camera 193. For example, during photographing, a shutter is pressed, light is transmitted to a photosensitive element of the camera through lens. An optical signal into an electrical signal. The photosensitive element of the camera transfers the electrical signal to the ISP for processing, so as to convert the signal into an image visible to the naked eye. The ISP may further optimize noise, brightness, and a skin color of the image through algorithms. The ISP may further optimize parameters such as exposure and a color temperature of a shooting scene. In some embodiments, the ISP may be provided in the camera 193.

The camera 193 is configured to capture a still image or a video. An optical image is generated for an object through lens and is projected to the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transfers the electrical signal to the ISP to convert it into a digital image signal. The ISP outputs the digital image signal to a DSP for processing. The DSP converts the digital image signal into an image signal of a standard format such as RGB or YUV. In some embodiments, the terminal device 100 may include one or N cameras 193, where N is a positive integer greater than 1.

The digital signal processor is configured to process a digital signal. In addition to processing a digital image signal, the digital signal processor may also process other digital signals. For example, when the terminal device 100 selects a frequency, the digital signal processor is configured to perform Fourier transform and the like on energy of the frequency.

The video codec is configured to compress or decompress a digital video. The terminal device 100 may support one or more types of video codecs, so that the terminal device 100 can play or record videos of multiple encoding formats, such as moving picture experts group (moving picture experts group, MPEG) 1, MPEG2, MPEG3, and MPEG4.

The NPU is a neural-network (neural-network, NN) computing processor that fast processes input information by using a biological neural network structure such as a transfer mode between human brain neurons and can also perform continuous self-learning. With the NPU, the terminal device 100 can implement intelligent cognition and other application such as image recognition, face recognition, voice recognition, and text understanding.

The external memory interface 120 may be configured to connect to an external memory card, such as a Micro SD card, to expand a storage capacity of the terminal device 100. The external memory card communicates with the processor 110 by using the external memory interface 120 to implement a data storage function, for example, saving music, video, and other files in the external memory card.

The internal memory 121 may be configured to store computer executable program code. The executable program code includes instructions. The internal memory 121 may include a storage program area and a storage data area. The storage program area may store an operating system, an application program required by at least one function (for example, a sound play function and an image play function), and the like. The data storage area may store data (for example, audio data and a phone book) created during the use of the terminal device 100. In addition, the internal memory 121 may include a high-speed random access memory, or may include a non-volatile memory such as at least one magnetic disk storage device, a flash memory device, and a universal flash storage (universal flash storage, UFS). The processor 110 implements various functional application and data processing of the terminal device 100 by running the instructions stored in the internal memory 121 and/or instructions stored in a memory provided in the processor.

The terminal device 100 may implement an audio function such as playing music or recording by using the audio module 170, the loudspeaker 170A, the telephone receiver 170B, the microphone 170C, the earphone jack 170D, the application processor, and the like.

The audio module 170 is configured to convert digital audio information into an analog audio signal for output, and is also configured to convert analog audio input into a digital audio signal. The audio module 170 may be further configured to encode and decode an audio signal. In some embodiments, the audio module 170 may be provided in the processor 110, or some functional modules of the audio module 170 may be provided in the processor 110.

The loudspeaker 170A, also referred to as a "speaker", is configured to convert an electrical audio signal into a sound signal. The terminal device 100 may be used to listen to music or answer a call by using the speaker 170A.

The telephone receiver 170B, also referred to as a "receiver", is configured to convert an electrical audio signal into a sound signal. When the terminal device 100 is used to answer a call or play a voice message, a user can hear voice by bringing the telephone receiver 170B close to an ear.

The microphone 170C, also referred to as a "mic" or "mike", is configured to convert a sound signal into an electrical signal. When making a call or sending a voice message, a user may input a sound signal into the microphone 170C by speaking close to the microphone 170C. The terminal device 100 may be provided with at least one microphone 170C. In some other embodiments, the terminal device 100 may be provided with two microphones 170C, to reduce noise in addition to collecting sound signals. In some other embodiments, the terminal device 100 may alternatively be provided with three, four, or more microphones 170C to collect sound signals, reduce noise, identify a sound source, implement directional recording, and the like.

The earphone jack 170D is configured to connect to a wired earphone. The earphone jack 170D may be the USB interface 130, or may be a 3.5 mm open mobile terminal platform (open mobile terminal platform, OMTP) standard interface, or a cellular telecommunications industry association of the USA (cellular telecommunications industry association of the USA, CTIA) standard interface.

The pressure sensor 180A is configured to sense a pressure signal, and can convert the pressure signal into an electrical signal. In some embodiments, the pressure sensor 180A may be provided on the display screen 194. There are many types of pressure sensors 180A, such as resistive pressure sensor, inductive pressure sensor, and capacitive pressure sensor. The capacitive pressure sensor may include at least two parallel plates made of a conductive material. When force is applied to the pressure sensor 180A, capacitance between electrodes changes. The terminal device 100 determines pressure intensity based on the change in the capacitance. When a touch operation is performed on the display screen 194, the terminal device 100 detects intensity of the touch operation by using the pressure sensor 180A. The terminal device 100 may further calculate a touch position based on a detection signal of the pressure sensor 180A. In some embodiments, touch operations performed at a same touch position but with different touch operation intensities may correspond to different operation instructions. For example, when a touch operation with a touch operation intensity less than a first pressure threshold is performed on a short message service application icon, an instruction to view an SMS text message is executed. When a touch operation with a touch operation intensity greater than or equal to the first pressure threshold is performed on the short message application icon, an instruction to create a new SMS text message is executed.

The gyro sensor 180B may be configured to determine a motion posture of the terminal device 100. In some embodiments, the gyro sensor 180B may be used to determine angular velocities of the terminal device 100 around three axes (that is, x, y, and z axes). The gyro sensor 180B may be used for image stabilization. For example, when a shutter is pressed, the gyro sensor 180B detects a shaking angle of the terminal device 100, and calculates, based on the angle, a distance that a lens module needs to be compensated for, so that the lens can move reversely to counteract the shaking of the terminal device 100, so as to implement image stabilization. The gyro sensor 180B may be further used for navigation and somatosensory game scenarios.

The barometric pressure sensor 180C is configured to measure barometric pressure. In some embodiments, the terminal device 100 calculates an altitude based on a barometric pressure value measured by the barometric pressure sensor 180C to assist in positioning and navigation.

The magnetic sensor 180D includes a Hall sensor. The terminal device 100 may use the magnetic sensor 180D to detect opening and closing of a flip case. In some embodiments, when the terminal device 100 is a flip phone, the terminal device 100 may detect opening and closing of a flip by using the magnetic sensor 180D. Furthermore, features such as automatic unlocking of the flip case are set based on the detected open or closed state of the case or the flip case.

The acceleration sensor 180E may detect magnitudes of accelerations of the terminal device 100 in all directions (usually three axes), may detect a magnitude and a direction of gravity when the terminal device 100 is still, and may be further configured to recognize a posture of the terminal device, for landscape/portrait mode switching, a pedometer, and the like.

The distance sensor 180F is configured to measure a distance. The terminal device 100 may measure a distance by using infrared or laser. In some embodiments, in a shooting scenario, the terminal device 100 may use the distance sensor 180F to measure a distance for rapid focusing.

The optical proximity sensor 180G may include, for example, a light emitting diode (LED) and an optical detector, such as a photodiode. The light emitting diode may be an infrared light emitting diode. The terminal device 100 emits infrared light to the outside by using the light emitting diode. The terminal device 100 uses the photodiode to perform detection for infrared light reflected by a nearby object. When sufficient reflected light is detected, it can be determined that an object is near the terminal device 100. When insufficient reflected light is detected, the terminal device 100 can determine that no object is near the terminal device 100. The terminal device 100 may use the optical proximity sensor 180G to detect that a user holds the terminal device 100 close to an ear for a call, so as to automatically turn off a screen to save power. The optical proximity sensor 180G may also be used for automatic screen unlock and lock in leather case mode and pocket mode.

The ambient light sensor 180L is configured to sense brightness of ambient light. The terminal device 100 may adaptively adjust brightness of the display screen 194 based on the sensed brightness of the ambient light. The ambient light sensor 180L may also be configured to automatically adjust white balance during photographing. The ambient light sensor 180L may also cooperate with the optical proximity sensor 180G to detect whether the terminal device 100 is in a pocket to avoid an accidental touch.

The fingerprint sensor 180H is configured to collect a fingerprint. The terminal device 100 may implement fingerprint unlocking, application lock access, fingerprint photographing, fingerprint call answering, and the like by using a feature of the collected fingerprint.

The temperature sensor 180J is configured to perform detection for a temperature. In some embodiments, the terminal device 100 executes a temperature processing policy by using the temperature detected by the temperature sensor 180J. For example, when the temperature reported by the temperature sensor 180J exceeds a threshold, the terminal device 100 reduces performance of a processor located near the temperature sensor 180J, so as to reduce power consumption and implement thermal protection. In some other embodiments, when the temperature is lower than another threshold, the terminal device 100 heats the battery 142 to avoid abnormal shutdown of the terminal device 100 caused by low temperature. In some other embodiments, when the temperature is lower than still another threshold, the terminal device 100 boosts an output voltage of the battery 142 to avoid abnormal shutdown caused by low temperature.

The touch sensor 180K is also referred to as a "touch device". The touch sensor 180K may be disposed on the display screen 194, and the touch sensor 180K and the display screen 194 form a touchscreen, also referred to as a "touch screen". The touch sensor 180K is configured to detect a touch operation performed on or near the touch sensor 180K. The touch sensor may transfer the detected touch operation to an application processor to determine a touch event type, and provide visual output related to the touch operation through the display screen 194. In some other embodiments, the touch sensor 180K may alternatively be disposed on a surface of the terminal device 100, that is, at a location different from that of the display screen 194.

The bone conduction sensor 180M may obtain a vibration signal. In some embodiments, the bone conduction sensor 180M may obtain a vibration signal generated when a human voice vibrates a bone. The bone conduction sensor 180M may also sense human pulse to receive a blood pressure pulse signal. In some embodiments, the bone conduction sensor 180M may alternatively be provided in an earphone to form a bone conduction earphone. The audio module 170 may parse out a voice signal from the vibration signal obtained by the bone conduction sensor 180M when the human voice vibrates the bone, to implement a voice function. The application processor may parse out heart rate information from the blood pressure pulse signal obtained by the bone conduction sensor 180M, to implement a heart rate detection function.

The key 190 includes a power-on key, a volume key, and the like. The key 190 may be a mechanical key, or may be a touch key. The terminal device 100 may receive key input to generate key signal input associated with user settings and function control of the terminal device 100.

The motor 191 may generate a vibration prompt. The motor 191 may be used for vibration prompt for an incoming call, and may also be used for vibration feedback for a touch. For example, touch operations performed on different applications (for example, photographing and audio play) may correspond to different vibration feedback effects. The motor 191 may also correspondingly provide different vibration feedback effects for touch operations performed in different areas of the display screen 194. Different application scenarios (for example, time reminder, information reception, alarm clock, and gaming) may also correspond to different vibration feedback effects. The touch vibration feedback effect may also be customized.

The indicator 192 may be an indication lamp and may be configured to indicate a charging status, a power change, a message, a missed call, a notification, and the like. The SIM card interface 195 is configured to connect to a SIM card. The SIM card may be inserted into the SIM card interface 195 or pulled out from the SIM card interface 195, to come into contact with and separate from the terminal device 100. The terminal device 100 may support 1 or N SIM card interfaces, where N is a positive integer greater than 1. The SIM card interface 195 may support a nano SIM card, a micro SIM card, a SIM card, and the like. Multiple cards may be inserted into a same SIM card interface 195 at the same time, where the multiple cards may be of a same type or different types. The SIM card interface 195 may also be compatible with different types of SIM cards. The SIM card interface 195 may also be compatible with an external memory card. The terminal device 100 interacts with a network through a SIM card to implement functions such as call answering and data communication. In some embodiments, the terminal device 100 adopts an eSIM, that is, an embedded SIM card. The eSIM card may be embedded in the terminal device 100 and cannot be separated from the terminal device 100.

Figure 2:
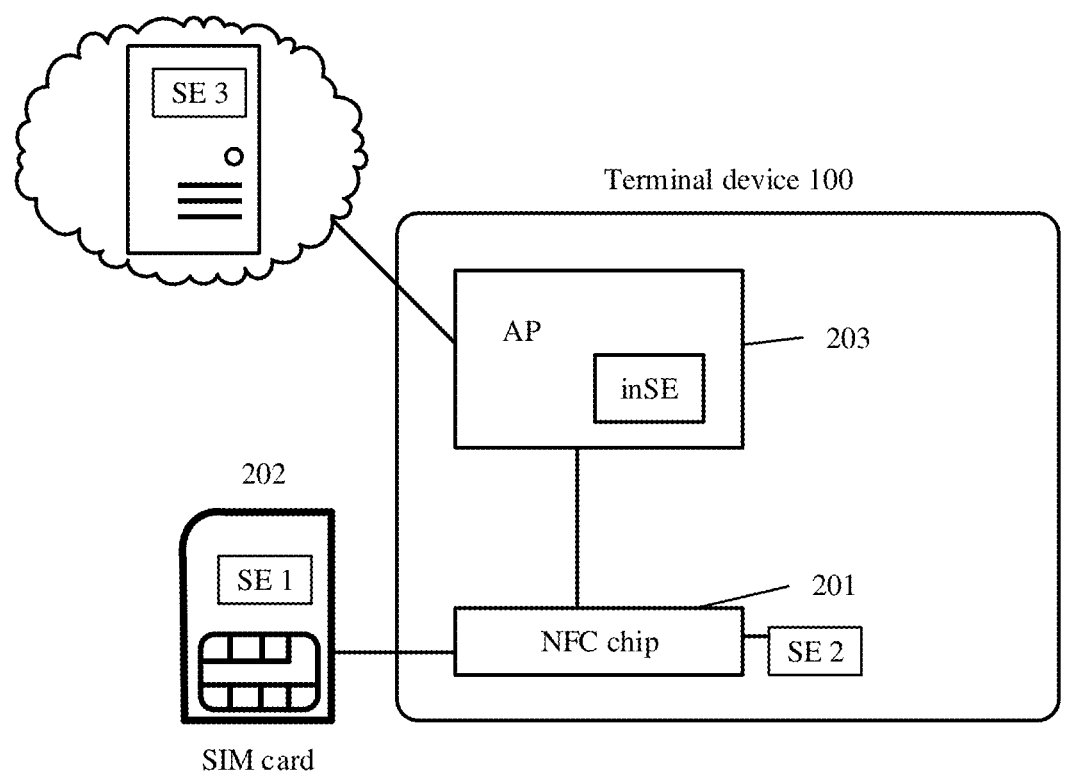
FIG. 2 is a second schematic diagram of a terminal device according to an embodiment of this application.

As shown in FIG. 2, this application provides a second schematic structural diagram of the terminal device 100.

The terminal device 100 has a near-field communication (Near-field communication, NFC) function, and includes an NFC chip 201, a SIM card slot (a SIM card or an eSIM card is placed in the card slot) 202, and an application processor 203. The NFC chip is coupled to different safety elements (safe element, SE) to implement the method in the embodiments. For example, a safety element SE1 may be configured in the SE1, and a safety element inSE may also be coupled to the application processor. A safety element SE2 may be independent of the NFC chip or integrated into an SOC, and a safety element SE3 may be configured on a server side.

Figure 3:
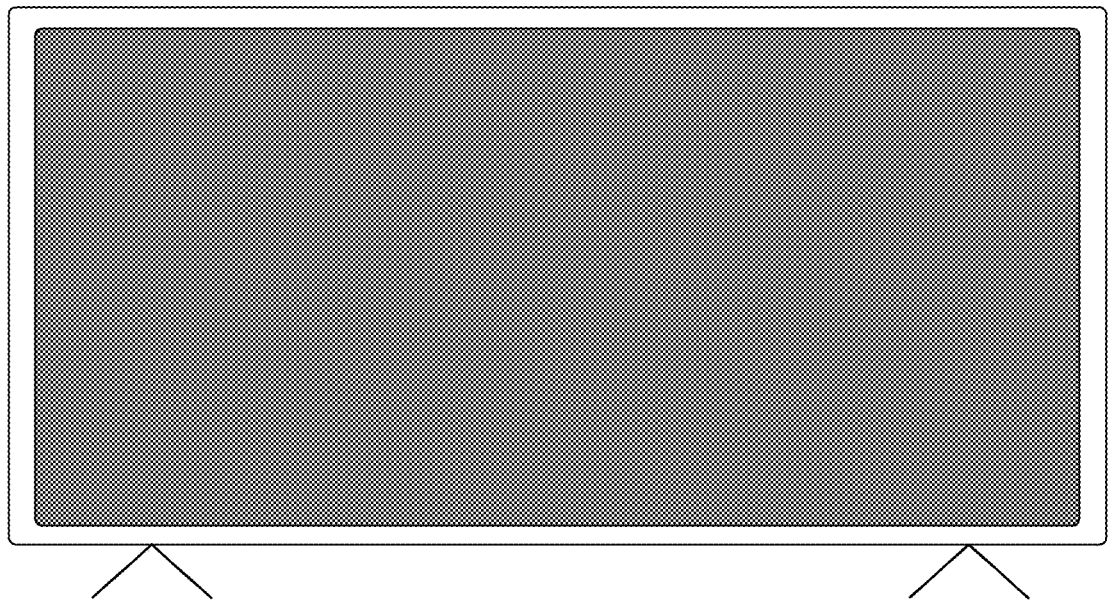
FIG. 3 is a first schematic diagram of a screen projection system according to an embodiment of this application.
Figure 3:
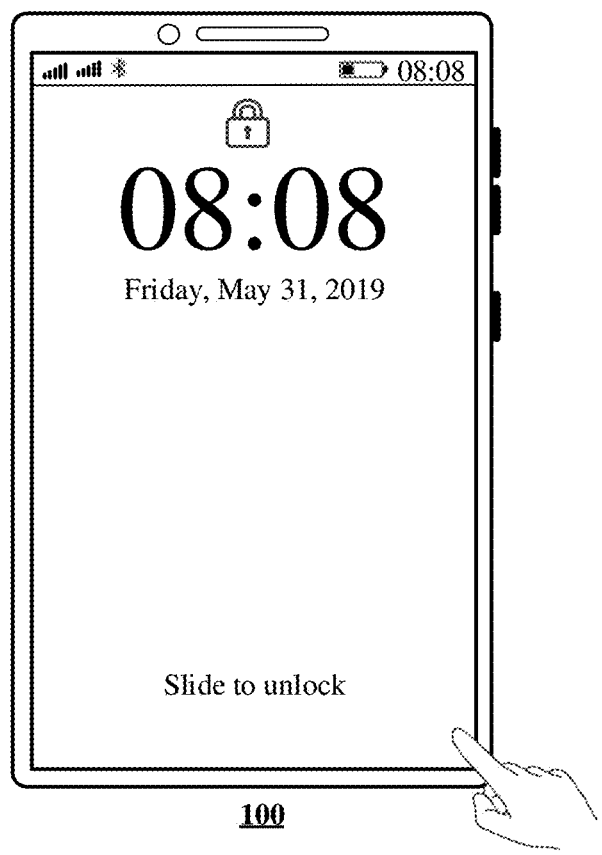

As shown in FIG. 3, an embodiment of this application provides a screen projection system, including a terminal device 100 and a display device 200. The terminal device 100 projects displayed content (including data such as a desktop, a video, and audio) of the terminal device 100 on the display device 200 by using a wireless projection technology. The wireless projection technology may be Miracast, DLNA, AirPlay, WIDI, WHDI, Wireless HD, and some custom protocols, such as Bluetooth, Wi-Fi, ultra wideband UWB (Ultra Wide Band), or other short-range communication technologies. After screen projection is completed, the display device 200 may display a screen of the terminal device 100, for example, the home screen or the played video.

In some embodiments, the display device 200 may display a first window after screen projection is completed. The first window is used to display the screen of the terminal device 100, and other controls and the like may be displayed in an area outside the first window.

In some embodiments, the terminal device 100 may also project an operation or action of a user on the display device 200, including movement of a mouse or pointer, an operation on an icon of an application program, and the like. For example, the terminal device 100 receives a user operation of starting a first application program, and the terminal device starts the first application program in response to the first operation and displays a first screen of the first application program. Similarly, the above steps and the first screen of the first application program may also be displayed on the display device 200.

In some embodiments, after the terminal device 100 completes the screen projection operation, the display device 200 may display the screen of the terminal device 100. Further, the terminal device 100 may be used as a touchpad to receive a trigger operation of a user and control an operation of the display device 200. Specifically, after receiving the trigger operation of the user on the terminal device 100, the display device 200 may complete a corresponding action. For example, the terminal device 100 receives a tap action, and the display device 200 starts the first application program and the like.

The display device in this application includes common large-screen display devices such as a display screen, a computer, and a projector, or may be a terminal device with a display screen such as a mobile phone and a tablet computer. Mainstream large-screen products currently on the market may be classified into four categories by display mode: LED displays, plasma tiled displays, LCD tiled displays, and DLP tiled displays. This is not limited in the embodiments of this application.

Figure 4:
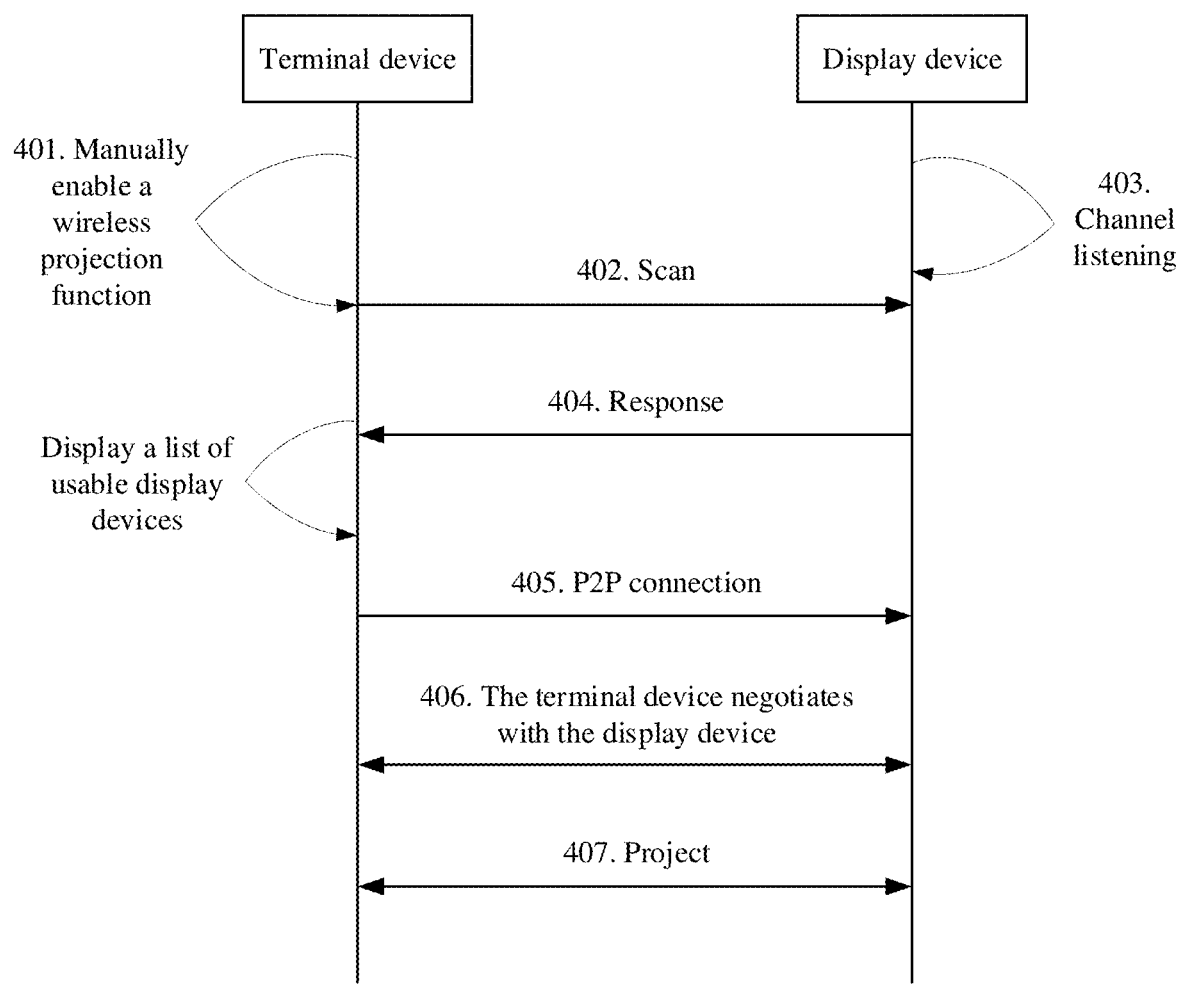
FIG. 4 is a first schematic diagram of a screen projection method according to an embodiment of this application.

Generally, as shown in FIG. 4, a method for projecting a screen onto a display device 200 by using a terminal device 100 is provided, and the method specifically includes the following steps.

Step 401: The terminal device 100 enables a wireless projection function.

Figure 5:
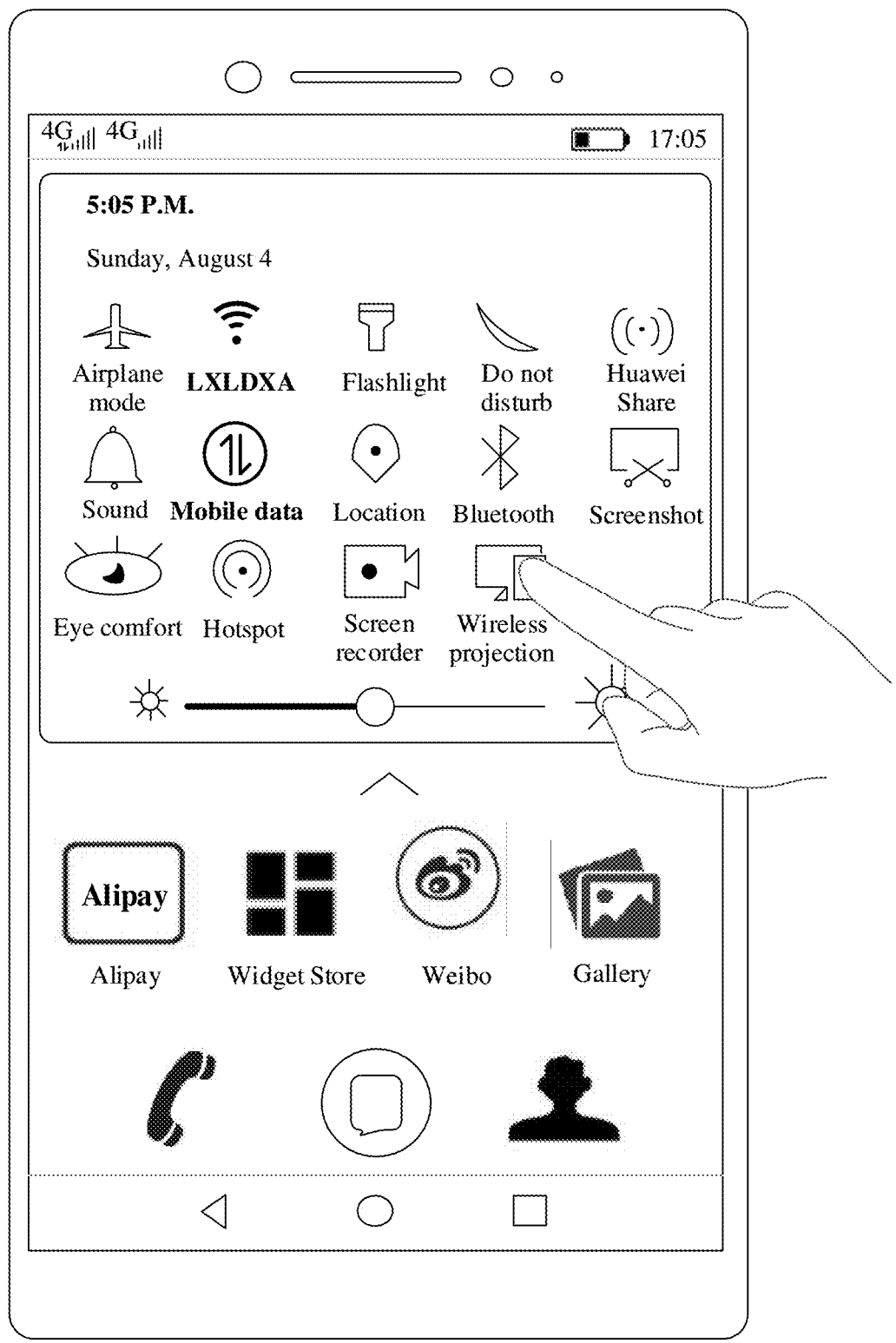
FIG. 5 is a first user interface diagram of a screen projection method according to an embodiment of this application.

Specifically, as shown in FIG. 5, the terminal device 100 receives a user operation of enabling the wireless projection function, for example, tapping a "wireless projection" control in a status bar. In some possible embodiments, the wireless projection function may alternatively be enabled on a user settings screen.

Figure 6:
FIG. 6 is a second user interface diagram of a screen projection method according to an embodiment of this application.

As shown in FIG. 6, when receiving a user operation of enabling the wireless projection function, the terminal device 100 displays a first screen. As shown in FIG. 6, the first screen includes a first pop-up box. The first pop-up box is used to prompt the user that the wireless projection function has been enabled. The first pop-up box also includes a "view help" option and a "cancel" option. When receiving a user operation of tapping the "view help" option, the terminal device displays a second screen. The second screen includes prompt information, where the prompt is used to prompt the user how to set up a wireless projection, and the prompt information may include a video, a text, an image, and the like. When receiving a user operation of tapping the "cancel" option, the terminal device returns to the home screen or stops displaying the first pop-up box.

In some embodiments, the first pop-up box or the first screen may further display a list of nearby usable devices. It can be understood that after the terminal device receives the user operation of enabling the screen projection function, the terminal device starts to scan for nearby display devices that may be used for screen projection. Scan may be performed by using a short-range communication technology such as Bluetooth or Wi-Fi. When the scan succeeds, a device identifier such as a device name of a display device discovered by scanning may be displayed in the first pop-up box or the first screen.

In some embodiments, in a case that the terminal device has not enabled a Bluetooth or Wi-Fi function, the terminal device enables the Bluetooth or Wi-Fi function in response to the user operation of enabling the screen projection function.

Step 402: The terminal device 100 scans for a nearby display device 200.

After receiving the operation of enabling the wireless projection function, the terminal device 100 starts to scan for a nearby display device 200.

Specifically, the terminal device 100 may perform Wi-Fi full channel (2.4G and 5G channels) scan to discover multiple nearby display devices. In some embodiments, after performing full channel scan, the terminal device 100 may further scan only for a fixed channel, such as a channel 1, a channel 6, or a channel 11.

In some embodiments, the nearby display device 200 may alternatively be discovered by using a low-power BLE Bluetooth technology.

In some embodiments, the terminal device 100 sends a scan request request to the nearby display device 200 over a specified channel.

Step 403: The display device 200 listens to a channel.

Specifically, after being powered on, the display device 200 may keep listening to a Wi-Fi channel, so as to discover the terminal device 100 or be discovered.

In some embodiments, when the display device 200 is being initialized (for example, being configured for the first time), and the display device 200 itself enables a Wi-Fi hotspot function for configuration with a remote control 300 or the terminal device 100, where the configuration is mainly used to enable the display device to connect to a router for networking, the display device 200 may not listen to a Wi-Fi channel.

In some embodiments, the display device 200 may alternatively receive a user operation of enabling Wi-Fi channel listening. For example, a user opens a wizard screen (for example, a Miracast projection screen or a Huawei share application program screen), and the display device 200 starts Wi-Fi channel listening in response to the user operation of opening the wizard screen. The channel listening may alternatively be scanning for a fixed channel, such as a channel 1, a channel 6, or a channel 11. Fixed channel scan is faster than full band scan. When the terminal device 100 and the display device 200 are made by a same manufacturer, fixed channel scan may be used, so as to increase a scan speed and efficiency by using preset channel information.

After the scan succeeds, that is, the terminal device 100 discovers a nearby usable device, a device identifier such as the device name of the display device discovered by scanning may be displayed in the first pop-up box or the first screen.

In some embodiments, the display device may alternatively initiate screen projection scan, and the terminal device performs channel listening. After the display device completes the scan, the display device may display a list of nearby usable terminal devices.

Step 404: The display device 200 returns a response message to the terminal device 100.

In some embodiments, after the scan request request of the terminal device 100 is obtained through listening on a specific channel, the display device 200 sends a scan response response to the terminal device 100.

In some embodiments, the response message may carry identification information of the display device 200, for example, information such as a manufacturer device, a device name, a device icon, a device ID, and a MAC address.

Step 405: The terminal device 100 negotiates with the display device 200.

The terminal device 100 may display the identification information of the display device 200 in the first screen or the first pop-up box, and receive a user operation on the identification information. The terminal device 100 and the display device 200 perform parameter negotiation or establish a P2P connection.

Step 406: The terminal device 100 completes the screen projection operation on the display device 200.

After screen projection is completed, the display device 200 may display a screen of the terminal device 100, for example, the home screen or the played video.

In some embodiments, the display device 200 may display a first window after screen projection is completed. The first window is used to display the screen of the terminal device 100, and other controls and the like may be displayed in an area outside the first window.

In some embodiments, the terminal device 100 may also project a user operation on the display device 200. For example, the terminal device 100 receives a user operation of starting a first application program, and the terminal device starts the first application program in response to the first operation and displays a first screen of the first application program. Similarly, the above steps and the first screen of the first application program may also be displayed on the display device 200.

In some embodiments, after the terminal device 100 completes the screen projection operation, the display device 200 may display the screen of the terminal device 100. Further, the terminal device 100 may be used as a touchpad to receive a trigger operation of a user and control an operation of the display device 200. Specifically, after receiving the trigger operation of the user on the terminal device 100, the display device 200 may complete a corresponding action. For example, the terminal device 100 receives a tap action, and the display device 200 starts the first application program and the like.

As shown in FIG. 6, the terminal device 100 displays a list of nearby usable display devices, and the device list includes information such as an icon of the display device 200.

The terminal device 100 receives a user operation of tapping the icon of the display device 200, and in response to the user operation, the terminal device 100 initiates a screen projection request to negotiate an associated screen projection protocol.

It should be noted that the foregoing wireless projection procedure may follow a Wi-Fi P2P work process, including the following steps: device discovery, group coordination, authentication and association, a WPS connection process, and four handshakes.

Some of steps 401 to 406 may be performed in a changed order or at the same time.

Figure 7:
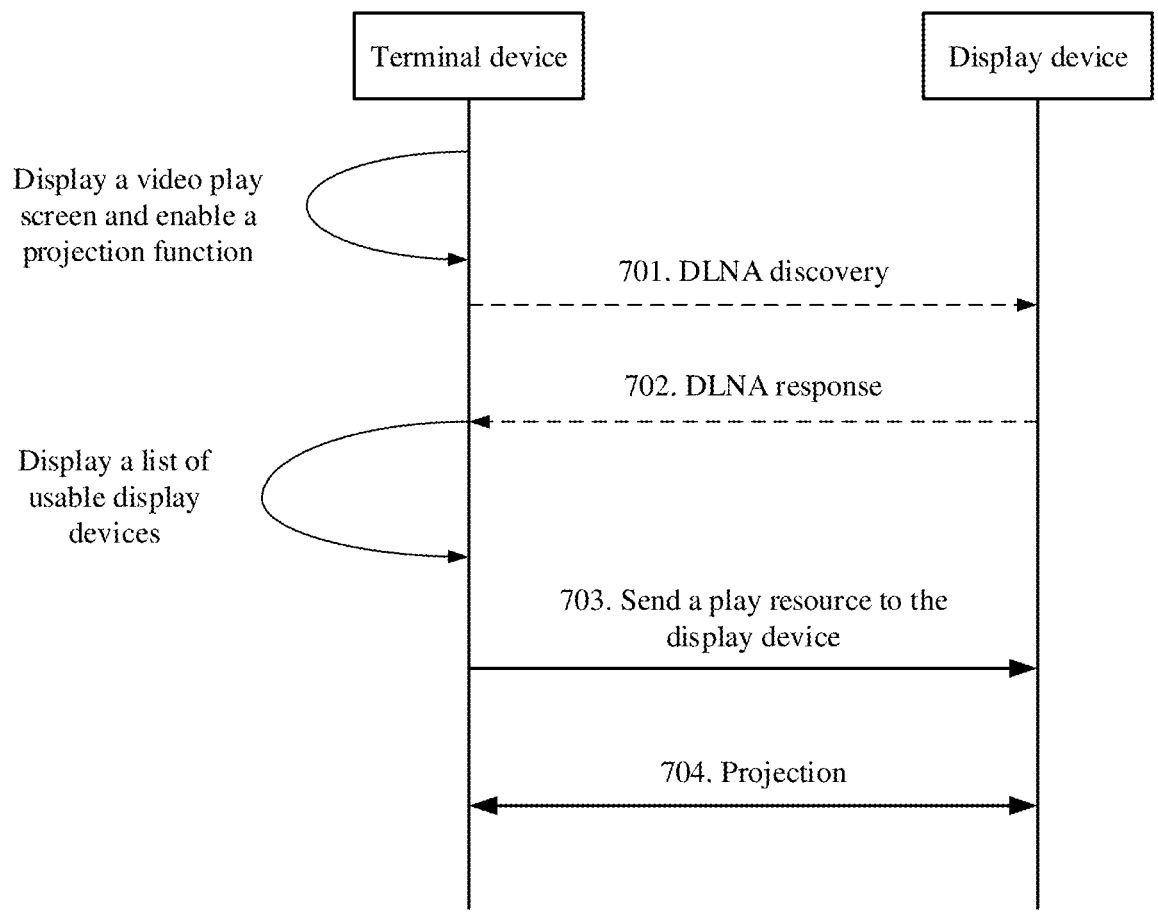
FIG. 7 is a second schematic diagram of a screen projection method according to an embodiment of this application.

Generally, as shown in FIG. 7, an embodiment of this application further provides a method for projecting a screen onto a display device 200 by using a terminal device 100, and the method specifically includes the following steps.

Step 701: Perform discovery based on digital living network alliance DLNA (Digital Living Network Alliance, DLNA for short).

Figure 8:
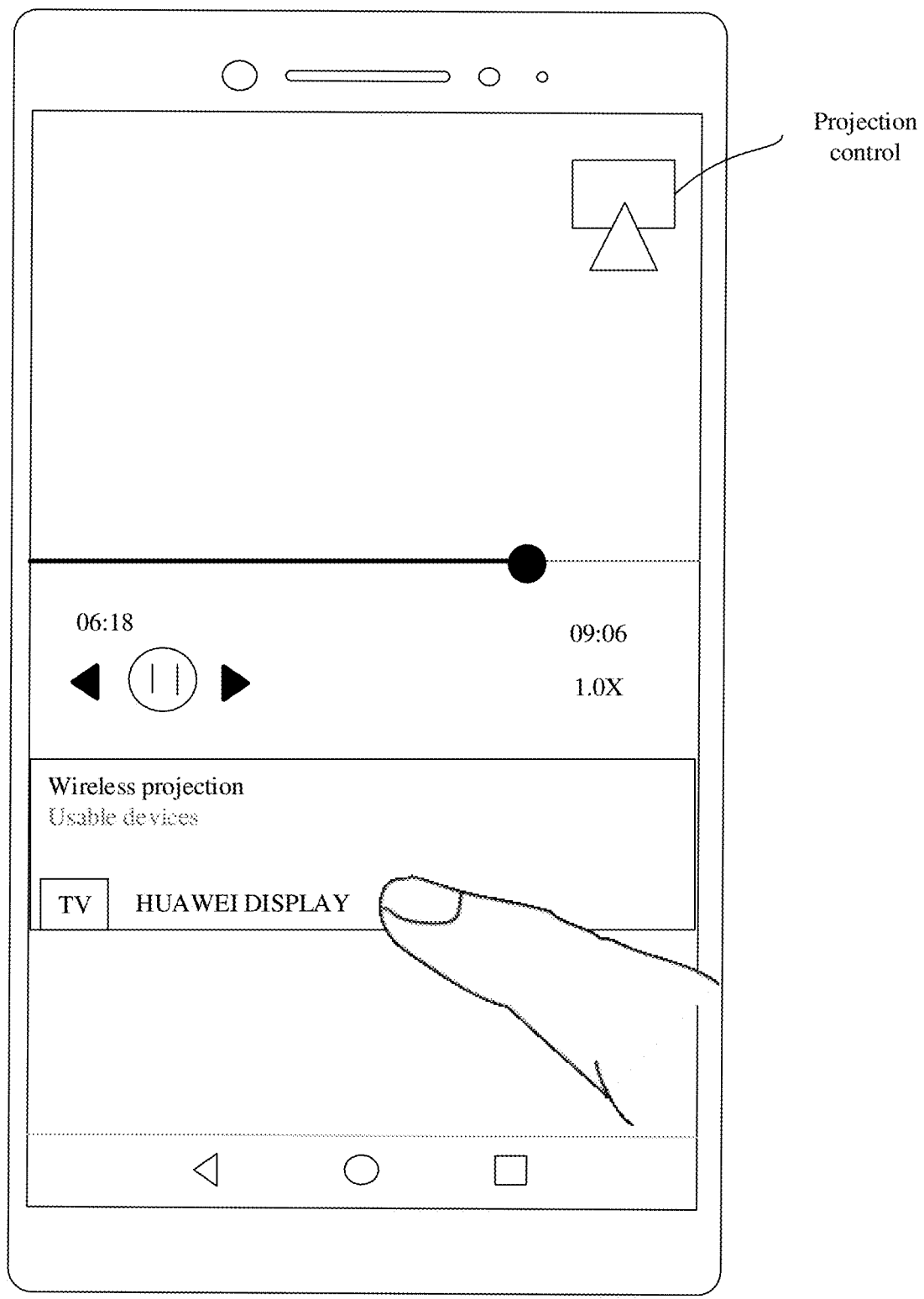
FIG. 8 is a third user interface diagram of a screen projection method according to an embodiment of this application.

The terminal device 100 opens a to-be-watched video and enables a screen projection function. In this embodiment of this application, video projection is used as an example. As shown in FIG. 8, the terminal device 100 opens a play screen of a video application, where the play screen has a first option, and the first option is used to indicate a screen projection function, for example, tapping a "wireless projection" control; receives a first operation of a user, for example, a tap operation, and displays a list of nearby usable devices; receives a second operation of the user, for example, selecting a device for screen projection, and projects the video play screen onto the device selected by the user.

In some embodiments, the terminal device 100 displays a first video play screen, where the screen includes a first option. The play screen displays a second screen or a first window after a user operation on a first selection is received, where the second screen or the first window includes multiple controls, such as send file, multicast, print, share to computer, screen projection, and one-touch transmit. A second operation of the user is received, for example, selecting a screen projection operation, where the second screen, the first window, or a third screen displays a list of nearby screen projection receiving devices. A third operation of the user is received, and the terminal device projects a screen onto a device selected by the user.

In response to the user operation of enabling the wireless projection control, the terminal device 100 initiates wireless local area network scan broadcast, that is, the terminal device 100 may initiate, by using a local area network, scanning of multiple display devices in the local area network. Different from the screen projection based on the Miracast protocol, screen projection in this embodiment uses a broadcast based screen projection protocol DLNA.

In some embodiments, an image, an application, a desktop, a document, and the like may also be projected to a screen.

Step 702: The display device 200 returns a DLNA response.

When the terminal device 100 initiates broadcast scanning of the display devices in the local area network, in response to the scan broadcast, the display device returns a response broadcast message to the terminal device 100. As shown in FIG. 8, when the terminal device 100 receives a response message from the display device 200 (for example, HUAWEI DISPLAY), the terminal device 100 displays a list of usable screen projection receiving devices.

Generally, a DLNA-enabled display device returns a response based on a discovery message of the terminal device 100.

Step 703: The terminal device 100 sends a play source address to the display device 200.

When displaying the list of usable display devices in the local area network, the terminal device 100 may accept a selection operation of the user, for example, selecting "HUAWEI DISPLAY" as a screen projection receiving device. In response to the selection operation of the user, the terminal device 100 sends the play source address of a video in a video application to the display device 200. In some embodiments, the source address may be sent to the display device 200 through directed broadcast in the local area network.

Step 704: The display device 200 implements a screen projection function.

The display device 200 obtains video content based on the source address of the played video sent by the terminal device 100, so as to implement the screen projection function.

The foregoing screen projection method requires manual setting by the user, and therefore is relatively cumbersome. Screen projection carried out according to standard protocols includes mirror screen projection (Miracast) and application screen projection (DLNA). For users, operation steps are many and time-consuming.

Figure 9A:
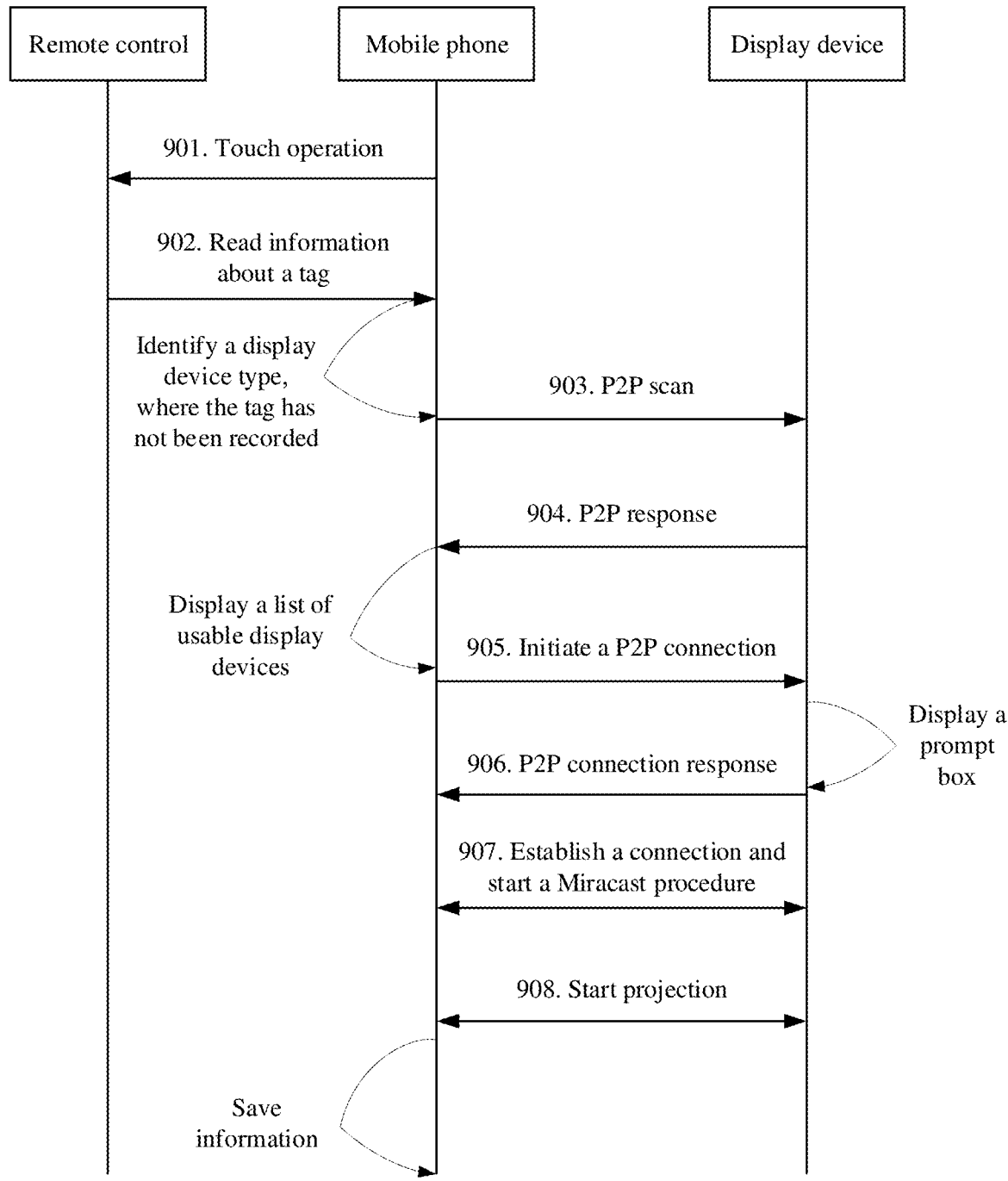
FIG. 9A is a third schematic diagram of a screen projection method according to an embodiment of this application.

Based on this, as shown in FIG. 9A, an embodiment of this application further provides a system in which a terminal device 100 implements a "one-touch screen projection" function on a display device 200 by using a remote control 300. The system includes the terminal device 100, the display device 200, and the remote control 300 matching the display device 200. The remote control has an NFC function, or has a built-in NFC tag tag. The remote control is pre-configured with parameters of the display device 200, including information such as a device identifier (a device name, a MAC address, manufacturer information, or the like) and a screen projection parameter.

The specific method is as follows.

Step 901: The terminal device 100 touches the remote control 300 for the first time.

Specifically, when touching the remote control 300 for the first time, the terminal device 100 obtains content of the NFC tag tag in the remote control 300. The content includes default device identification information of the display device 200, for example, a device name, a device type, MAC address information, an identification code, and manufacturer information.

In some embodiments, the remote control 300 comes along with the display device 200, and a manufacturer assigns a unique identification code to the NFC tag tag of the remote control 300.

The terminal device 100 determines, based on whether the identification code of the tag tag has been stored, whether the touch is the first touch. When touching the tag tag, the terminal device obtains tag information in the tag tag. If the identification code of the tag tag has been stored in the terminal device 100, the touch is not regarded as the first touch. Further, the terminal device 100 records the tag information in the tag tag.

In some embodiments, an identification of the NFC tag tag may be attached to a surface of the remote control 300, for ease of touch by a user.

In some embodiments, the remote control 300 may supply power to the NFC tag tag by using a battery, or there may be a separate battery to supply power to the NFC tag tag.

In some embodiments, the terminal device needs to enable an NFC function and a WLAN function.

Step 902: Read tag tag information.

When the terminal device 100 approaches the remote control 300, the terminal device 100 may obtain the information in the NFC tag tag, including but not limited to the device name, device type, MAC address information, identification code, manufacturer information, and other information.

In some embodiments, the terminal device 100 obtains the identification code of the tag and device information of the display device 200 associated with the tag.

In some embodiments, the terminal device 100 is triggered to read the content of the NFC tag tag when a distance between the terminal device 100 and the remote control 300 is less than a threshold, a threshold for NFC interaction is reached, or strength of an NFC signal obtained by the terminal device 100 is greater than a threshold.

In some embodiments, multiple terminal devices 100 may all touch the remote control 300, so that different terminal devices 100 implement screen projection services.

Step 903: Initiate a P2P scan when the terminal device 100 recognizes that the device type in the NFC tag tag is a predetermined device type, and the terminal device 100 has not recorded the tag tag.

Specifically, during factory delivery, the remote control 300 comes along with the display device 200, and the tag tag of the remote control 300 stores the device information of the display device 200, for example, a device type, different device models of a same type, a device name, a device manufacturer, MAC address information, an identification code, and other information. In a possible embodiment, the terminal device 100 may preset a device type of a supported display device 200, as shown in the following table.

| No. | Device type identification of display device | Device type |
| --- | --- | --- |
| 1 | 0X11 | HUAWEI DISPLAY |
| 2 | 0X10 | APPLE DISPLAY |
| 3 | 0X11-1 | HUAWEI DISPLAY X65 |

The above table is only an example of device types of display devices supported by the terminal device 100. When the terminal device 100 obtains the tag information, the terminal device 100 determines, based on the tag tag information, that a display device 200 corresponding to the tag is a display device supported by the terminal device 100.

In some embodiments, the nearby display device 200 may alternatively be discovered by using a low-power BLE Bluetooth technology.

In some embodiments, the terminal device 100 sends a scan request request to the nearby display device 200 over a specified channel.

In some embodiments, the terminal device 100 stores device type information of the supported display device 200.

Step 904: The terminal device 100 receives a response from the display device 200.

In some embodiments, specifically, the display device 200 may keep listening to a Wi-Fi channel after being powered on, that is, in always-on mode, so as to discover the terminal device 100 or be discovered.

In some embodiments, a wireless projection function of the display device 200 needs to be enabled. This may be done by using a setting screen or a physical button, or on a screen of a projection application.

In some embodiments, when the display device 200 is being initialized (for example, being configured for the first time), and the display device 200 itself enables a Wi-Fi hotspot function for configuration with the remote control 300 or the terminal device 100, where the configuration is mainly used to enable the display device to connect to a router for networking, the display device 200 may not listen to a Wi-Fi channel.

In some embodiments, the display device 200 may alternatively receive a user operation of enabling Wi-Fi channel listening. For example, a user opens a wizard screen (for example, a Miracast projection screen or a Huawei share application program screen), and the display device 200 starts Wi-Fi channel listening in response to the user operation of opening the wizard screen. The channel listening may alternatively be scanning for a fixed channel, such as a channel 1, a channel 6, or a channel 11. Fixed channel scan is faster than full band scan. When the terminal device 100 and the display device 200 are made by a same manufacturer, fixed channel scan may be used, so as to increase a scan speed and efficiency by using preset channel information.

In some embodiments, after the scan request request of the terminal device 100 is obtained through listening on a specific channel, the display device 200 sends a scan response response to the terminal device 100.

In some embodiments, an NFC area of the mobile phone needs to be moved close to an NFCC touch area of the remote control, and remains in this state until the mobile phone gives a prompt sound or vibrates.

Step 905: The terminal device 100 receives a selection operation of the user and sends a P2P connection.

Figure 9B:
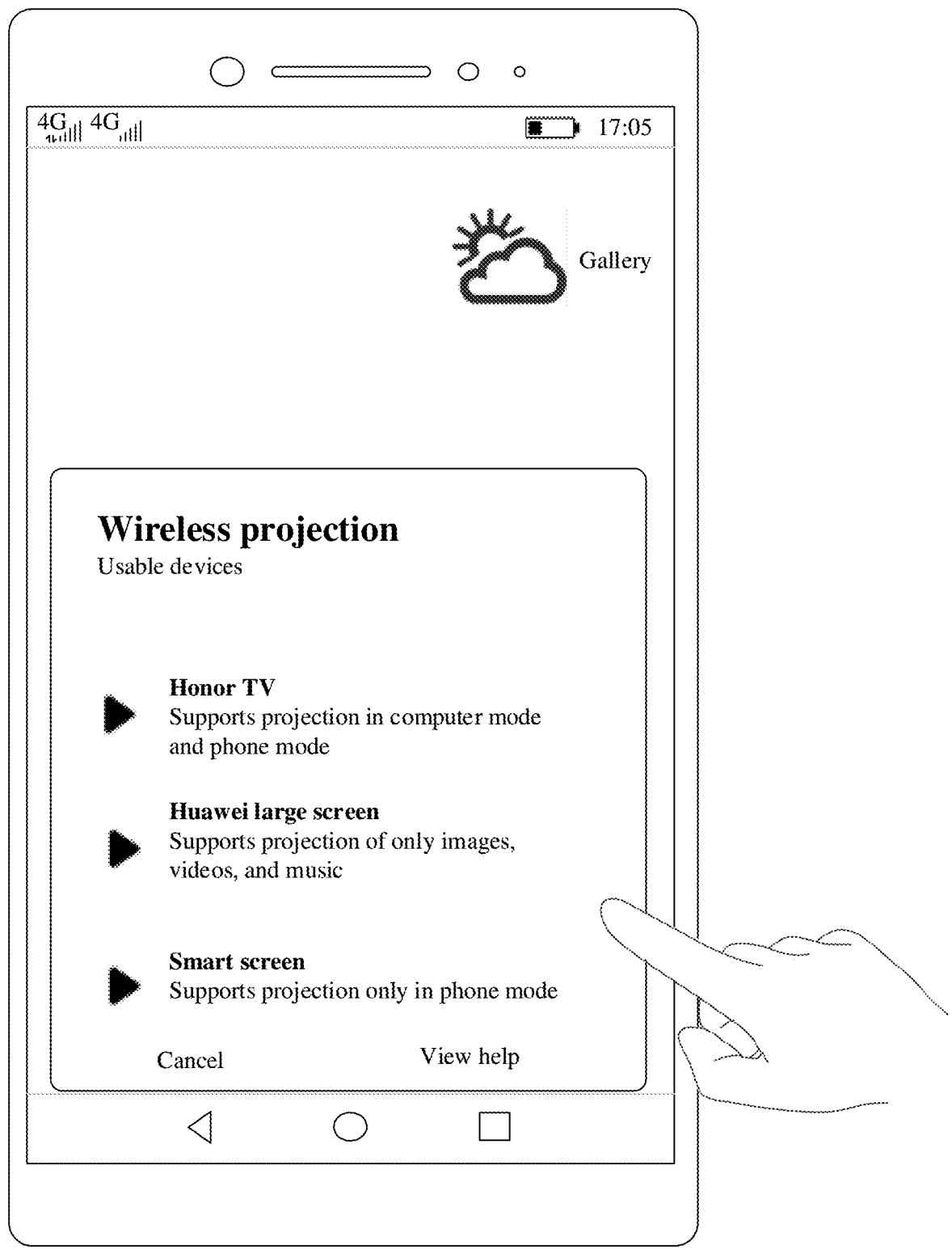
FIG. 9B is a fourth user interface diagram of a screen projection method according to an embodiment of this application.

As shown in FIG. 9B, when the terminal device 100 has discovered the nearby display device 200 through scan, the terminal device 100 displays a first pop-up box. The first pop-up box includes a list of nearby usable display devices. The device list includes device names and device icons of the nearby devices and capabilities supported by the devices. For example, an Honor TV supports projection in computer mode and mobile phone mode. For example, a Huawei large screen supports projection of only images, videos, and music. For example, a smart screen supports projection only in mobile phone mode.

The first pop-up box also includes a "view help" option and a "cancel" option. When receiving a user operation of tapping the "view help" option, the terminal device displays a second screen, where the second screen includes prompt information, the prompt is used to prompt a user how to set up a wireless projection, and the prompt information may include a video, a text, a picture, and the like. When receiving a user operation of tapping the "cancel" option, the terminal device returns to the home screen or stops displaying the first pop-up box.

In some embodiments, the terminal device 100 receives a first operation of a user, for example, an operation of tapping a Huawei large screen. The terminal device 100 initiates a connection with the display device 200 (Huawei large screen). For example, the terminal device 100 initiates a connection request.

Step 906: The display device 200 receives the connection request from the terminal device 100.

Figure 9C:
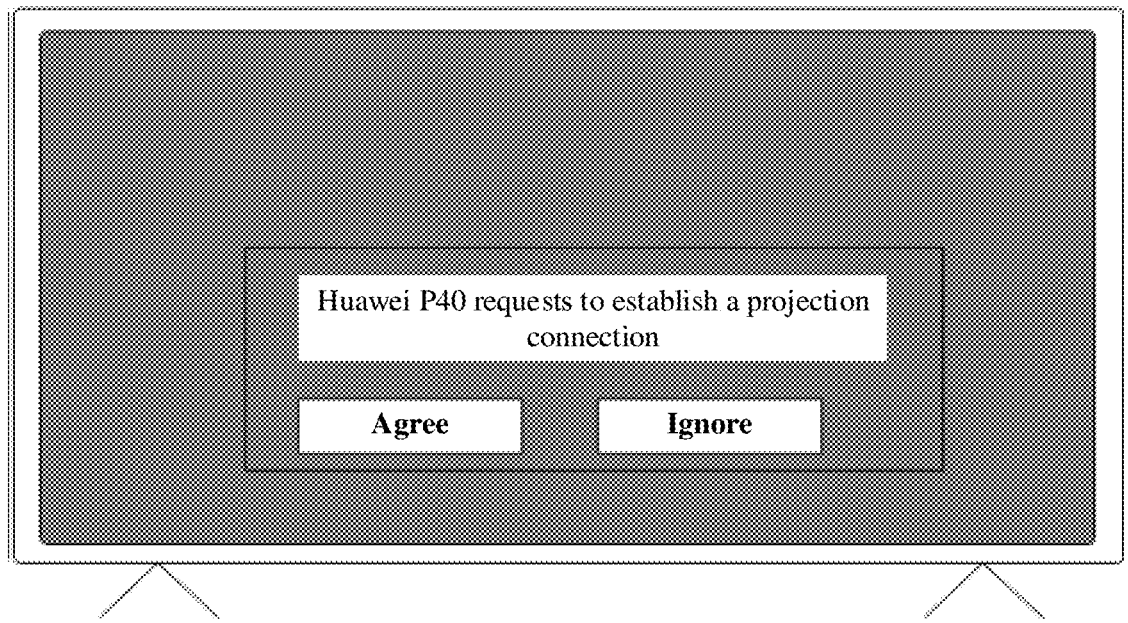
FIG. 9C is a fifth user interface diagram of a screen projection method according to an embodiment of this application.

After the display device 200 receives the connection request from the terminal device 100, a second pop-up box or a third screen pops up. The third screen or the second pop-up box displays prompt information, and the prompt information is used to prompt the user that the terminal device 100 needs to establish a screen projection connection with the display device 200. As shown in FIG. 9C, the display device 200 displays a second pop-up box, where the second pop-up box further includes a first option (agree) and a second option (ignore). When the display device 200 receives a user operation on the first option, the display device 200 establishes a screen projection connection with the terminal device 100. When the display device 200 receives a user operation on the second option, the display device 200 ignores the request of the terminal device 100 and stops displaying the second pop-up box or the third screen.

In some embodiments, the display device 200 displays the second pop-up box only for the initial connection.

In some embodiments, after receiving the connection request from the terminal device 100, the display device 200 may directly establish a screen projection connection without displaying a pop-up box. Establishing a connection without displaying a pop-up box may take place when the display device 200 is paired up for connection for the first time or the terminal device 100 is a device previously connected to the display device 200.

Figure 9D:
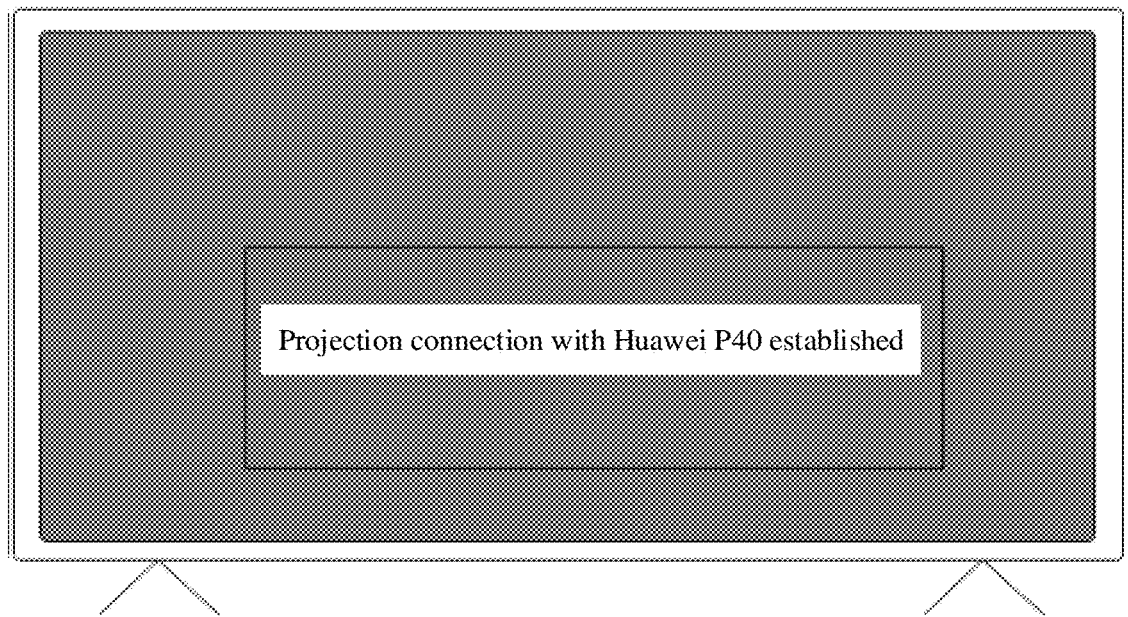
FIG. 9D is a sixth user interface diagram of a screen projection method according to an embodiment of this application.

In some embodiments, as shown in FIG. 9D, when the display device 200 receives a user operation on the first option, the display device 200 establishes a screen projection connection with the terminal device 100. The display device 200 may further display a third pop-up box. The third pop-up box prompts that the terminal device 100 has established a screen projection connection with the display device 200.

Step 907: The terminal device 100 establishes a connection with the display device 200.

Step 908: Start screen projection.

It should be noted that the above steps may be performed in a changed order or omitted.

In some embodiments, after the terminal device 100 establishes a screen projection connection with the display device 200, the terminal device 100 may accept a first operation of the user, for example, tapping "Display Device Operation" in a settings screen or an application program screen. That is, the display device 200 may be operated by using the terminal device 100. In other words, the terminal device 100 serves as a touchpad for the display device 200, which may be understood as an operation mode. Certainly, switching may be performed between the control mode and the screen projection mode.

In some embodiments, the terminal device 100 locally stores a P2P MAC address of the display device 200 with successful screen projection, and binds the unique identification code of the tag tag. As shown in the following table, the following correspondences are stored in the terminal device 100.

| No. | Tag identification code | Display device address |
| --- | --- | --- |
| 1 | 0X00 | 12:34:D5 |
| 2 | 0X01 | 12:34:D6 |

The above table is only an example of an association relationship between tags tag and display devices that is recorded by the terminal device 100, because an identification code is unique, and an address of the display device 200 is also unique. The terminal device may determine the address of the display device based on the identification code information obtained from the tag tag, so as to implement the "one-touch screen projection" function. In some embodiments, the terminal device 100 may further store a device type and other information that are corresponding to the tag tag.

In some embodiments, when obtaining the identification information of the display device 200 by touching the remote control 300, the terminal device 100 may establish a screen projection connection by directly initiating a connection request. The connection request includes the identification information of the display device 200 or identification information of the terminal device 100.

Figure 10:
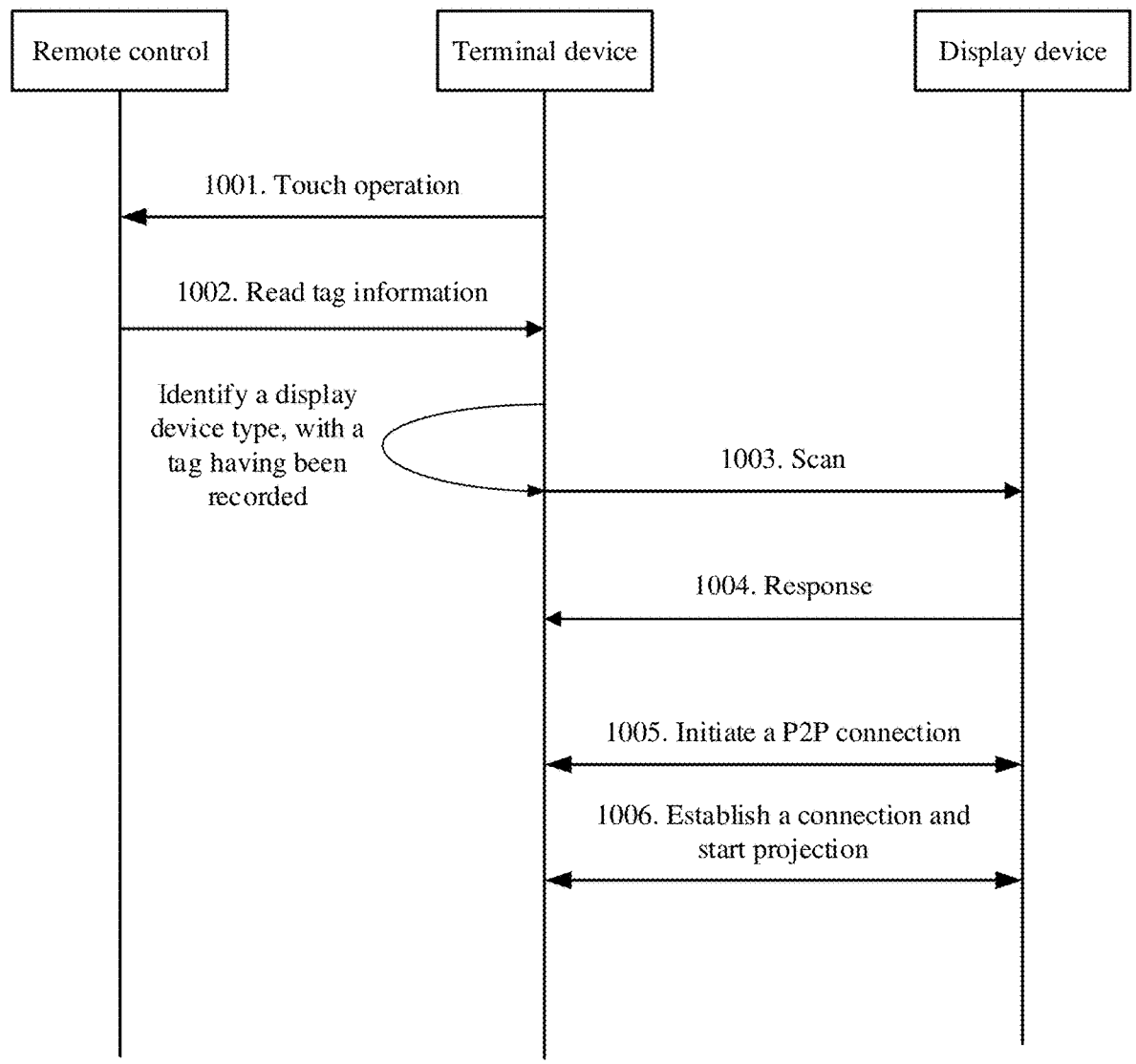
FIG. 10 is a fourth schematic diagram of a screen projection method according to an embodiment of this application.

Further, if it is not the first time for the terminal device 100 to touch the remote control 300, this application provides a more convenient screen projection method, as shown in FIG. 10.

Step 1001: The terminal device 100 touches the remote control 300.

Step 1002: The terminal device 100 obtains tag tag information.

In some embodiments, the tag information includes but is not limited to such information as a device type, different device models of a same type, a device name, a device manufacturer, MAC address information, and an identification code.

In some embodiments, the terminal device 100 is triggered to read the content of the NFC tag tag when a distance between the terminal device 100 and the remote control 300 is less than a threshold, a threshold for NFC interaction is reached, or strength of an NFC signal obtained by the terminal device 100 is greater than a threshold.

For steps 1001 and 1002, reference may be made to steps 901 and 902.

Step 1003: The terminal device 100 determines whether information about a display device 200 discovered by scanning matches stored information.

The terminal device 100 determines, based on the obtained tag tag information, information such as a device type, a MAC address, or an identification code of the display device 200 paired with the remote control 300, so as to determine whether the display device 200 is a display device on which the terminal device 100 has previously performed screen projection.

Step 1004: When the terminal device 100 determines that the information about a display device 200 discovered by scanning matches the stored information, the terminal device 100 initiates a P2P connection to the display device 200.

In some embodiments, when the terminal device 100 determines that the information about the display device 200 discovered by scanning does not match the stored display device information, it means that the current display device 200 is paired with the terminal device 100 for the first time, and a process for first pairing may be performed, as shown in FIG. 9A.

Step 1005: The terminal device 100 establishes a connection with the display device 200, and starts screen projection.

For the above steps, reference may be made to FIG. 9A to FIG. 9D and corresponding text descriptions. Compared with the first screen projection, in non-first screen projection, the terminal device 100 may perform a pairing scan based on stored historical information. For example, step 1003 or 1004 may be omitted, and the terminal device 100 directly initiates a P2P connection based on the recorded information of the display device 200.

In the foregoing embodiment, after the terminal device 100 obtains the tag information of the remote control 300, the terminal device 100 and the display device 200 establish a screen projection procedure by using a standard Miracast protocol.

Compared with other screen projection solutions, this embodiment of this application can implement "one-touch screen projection", making the screen projection more convenient and improving efficiency of a screen projection service.

Figure 11:
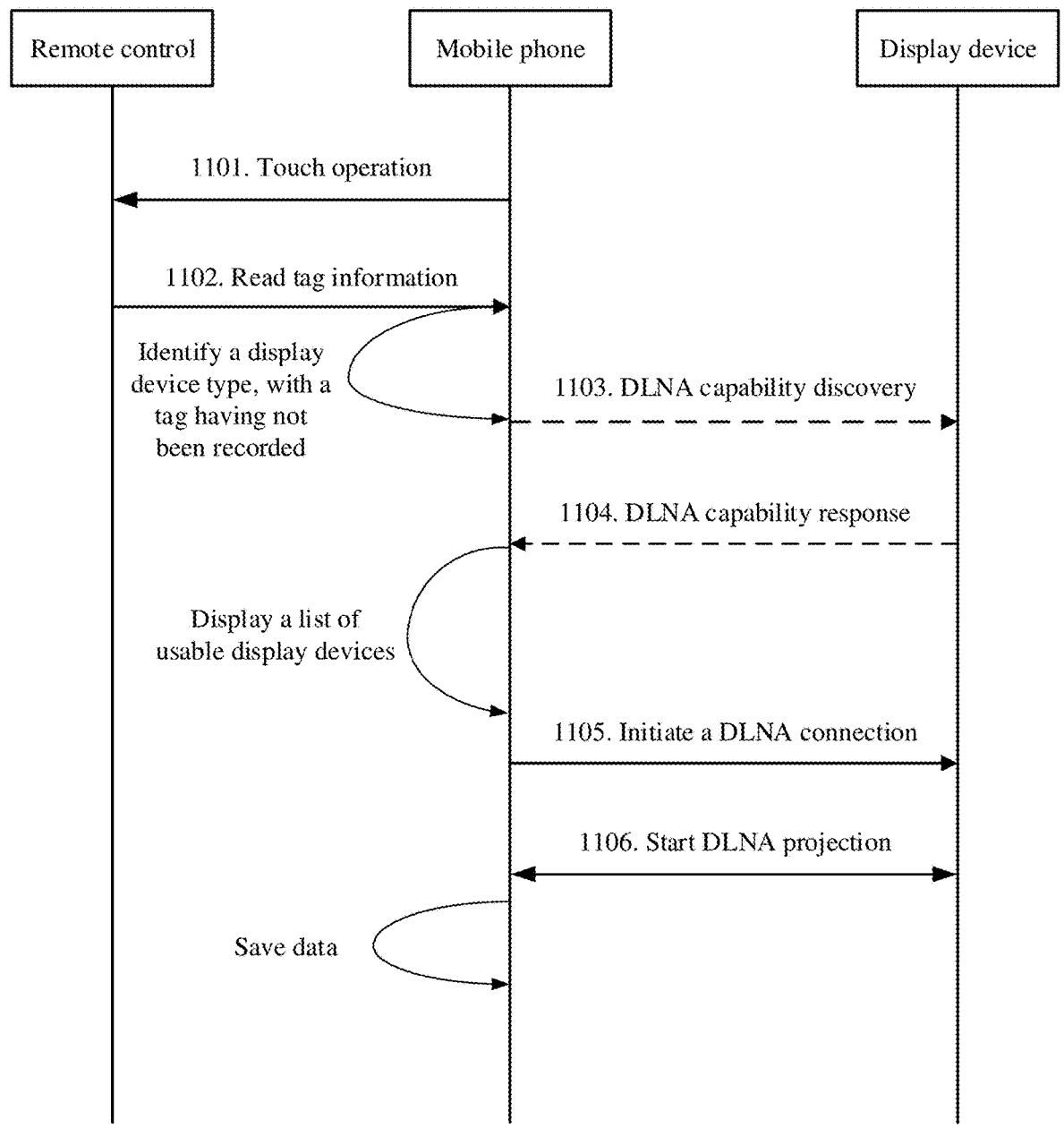
FIG. 11 is a fifth schematic diagram of a screen projection method according to an embodiment of this application.
Figure 12:
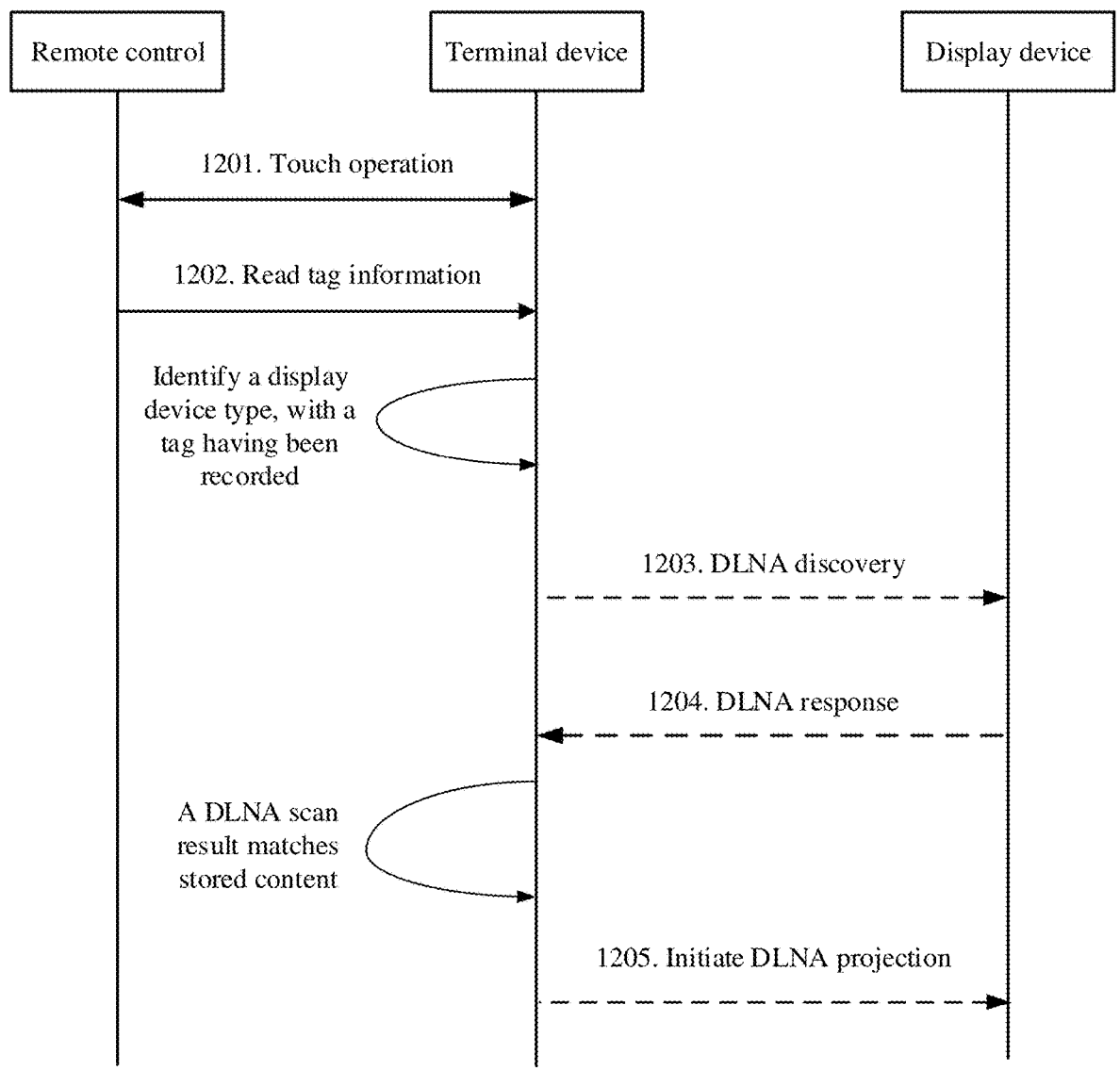
FIG. 12 is a sixth schematic diagram of a screen projection method according to an embodiment of this application.

An embodiment of this application further provides a screen projection method based on the DLNA protocol. As shown in FIG. 11, an embodiment of this application further provides a system in which a terminal device 100 implements a "one-touch screen projection" function on a display device 200 by using a remote control 300. The system includes the terminal device 100, the display device 200, and the remote control 300 matching the display device 200. The remote control has an NFC function, or has a built-in NFC tag tag. The remote control is pre-configured with parameters of the display device, including information such as a device identifier (a device name, a MAC address, a unique identification code, or the like) and a screen projection parameter.

The embodiments of this application provide new Miracast and DLNA screen projection methods to bring a consumer a convenient and fashionable experience. One-touch screen projection including mirror screen projection (Miracast) and application screen projection (DLNA) is implemented by using an NFC tag.

Step 1101: The terminal device 100 touches the remote control 300 for the first time.

Specifically, when touching the remote control 300 for the first time, the terminal device 100 obtains content of the tag tag in the remote control. The content includes a default device identifier of the display device 200, for example, a device name, a device type, MAC address information, and an identification code, and the tag tag has a unique identification code.

The terminal device 100 determines, based on whether the identification code of the tag tag has been stored, whether the touch is the first touch. When touching the tag tag, the terminal device obtains tag information in the tag tag. If the identification code of the tag tag has been stored in the terminal device 100, the touch is not regarded as the first touch. Further, the terminal device 100 records the tag information in the tag tag.

In some embodiments, an identification of the tag tag may be attach to a surface of the remote control 300, for ease of touch by a user.

In some embodiments, the terminal device 100 is triggered to read the content of the NFC tag tag when a distance between the terminal device 100 and the remote control 300 is less than a threshold, a threshold for NFC interaction is reached, or strength of an NFC signal obtained by the terminal device 100 is greater than a threshold.

Step 1102: Read tag tag information.

Step 1103: The terminal device 100 initiates a DLNA broadcast scan when the terminal device 100 recognizes that the device type in the tag is a predetermined device type, and the terminal device 100 has not recorded the tag tag, so as to discover the display device 200.

In some embodiments, as shown in FIG. 8, after the terminal device 100 receives the user operation of enabling the wireless projection function, the terminal device 100 initiates a DLNA broadcast message to scan for a nearby display device 200.

Step 1104: The display device 200 sends a scan response message to the terminal device 100.

After the terminal device 100 receives the scan response message from the display device 200, the terminal device 100 displays information about the display device 200 in a usable screen projection list, for example, information such as a device icon and a device name.

Step 1105: The terminal device 100 initiates a DLNA connection.

Step 1106: The terminal device 1106 starts DLNA screen projection.

An embodiment of this application further provides a screen projection operation for a non-first touch.

Step 1201: A terminal device 100 touches a remote control 300.

Specifically, the terminal device 100 may touch an NFC tag of the remote control 300.

Step 1202: The terminal device 100 reads tag tag information.

Step 1203: The terminal device 100 initiates DLNA discovery.

When reading the information in the tag tag, the terminal device 100 determines that a display device 200 is of a display device type supported by the terminal device, and when the terminal device 100 has recorded the tag, the terminal device 100 automatically initiates DLNA discovery to a display device corresponding to the tag tag in a local area network.

Step 1204: The display device 200 returns a DLNA response.

When the terminal device 100 receives the DLNA response message from the display device 200, the terminal device 100 retrieves the stored record for matching, for example, performing MAC address matching.

Step 1205: The terminal device 200 initiates a DLNA screen projection function.

Specifically, the terminal device 100 may send a source address of a to-be-projected video to the display device 200, and the display device 200 obtains video content from a network based on the source address and plays it.

Figure 13:
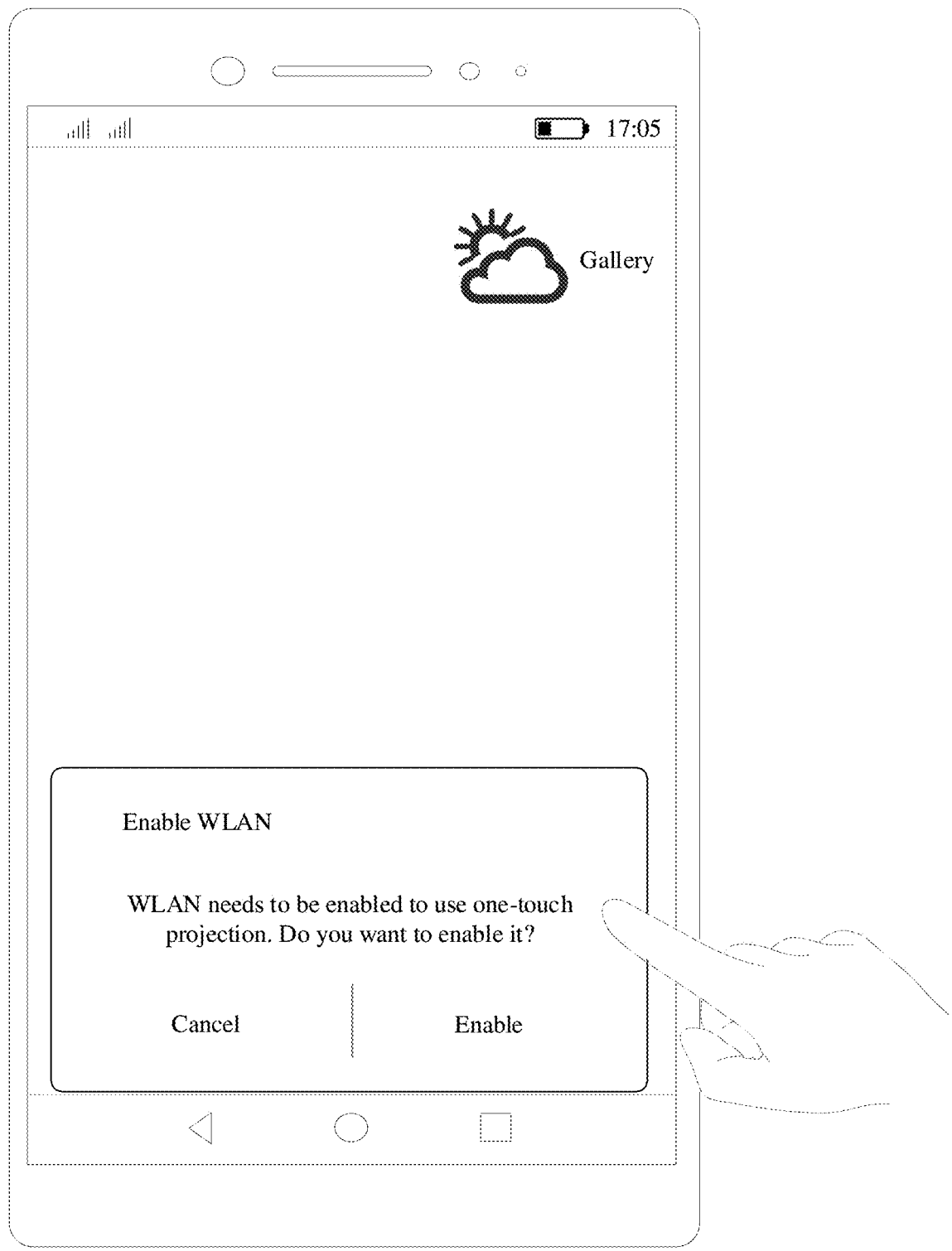
FIG. 13 is a seventh user interface diagram of a screen projection method according to an embodiment of this application.

As shown in FIG. 13, an embodiment of this application further provides a graphical user interface. When a terminal device 100 touches a remote control 300, In response to the touch operation, when the terminal device 100 has not enabled a WLAN local area network function, a pop-up box pops up to prompt a user whether to enable the WLAN. The terminal device 100 may accept a canceling operation or enabling operation of the user. When receiving a canceling operation of the user, the terminal 100 closes the pop-up box, without enabling the WLAN function or implementing a "one-touch screen projection" function. When receiving an enabling operation of the user, the terminal device 100 automatically enables the WLAN function, and performs the screen projection method according to the embodiments of this application.

Figure 14:
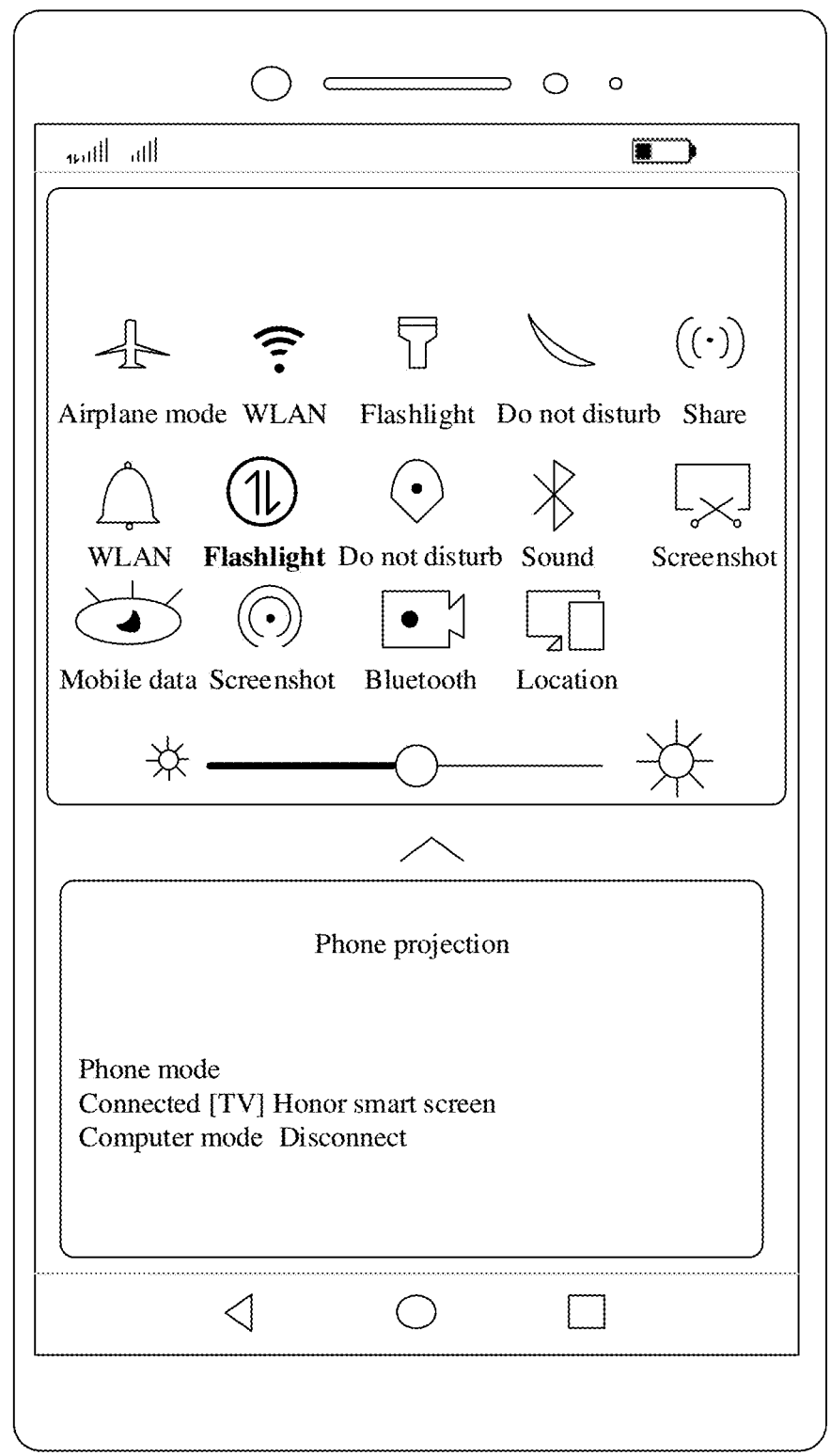
FIG. 14 is an eighth user interface diagram of a screen projection method according to an embodiment of this application.
Figure 15:
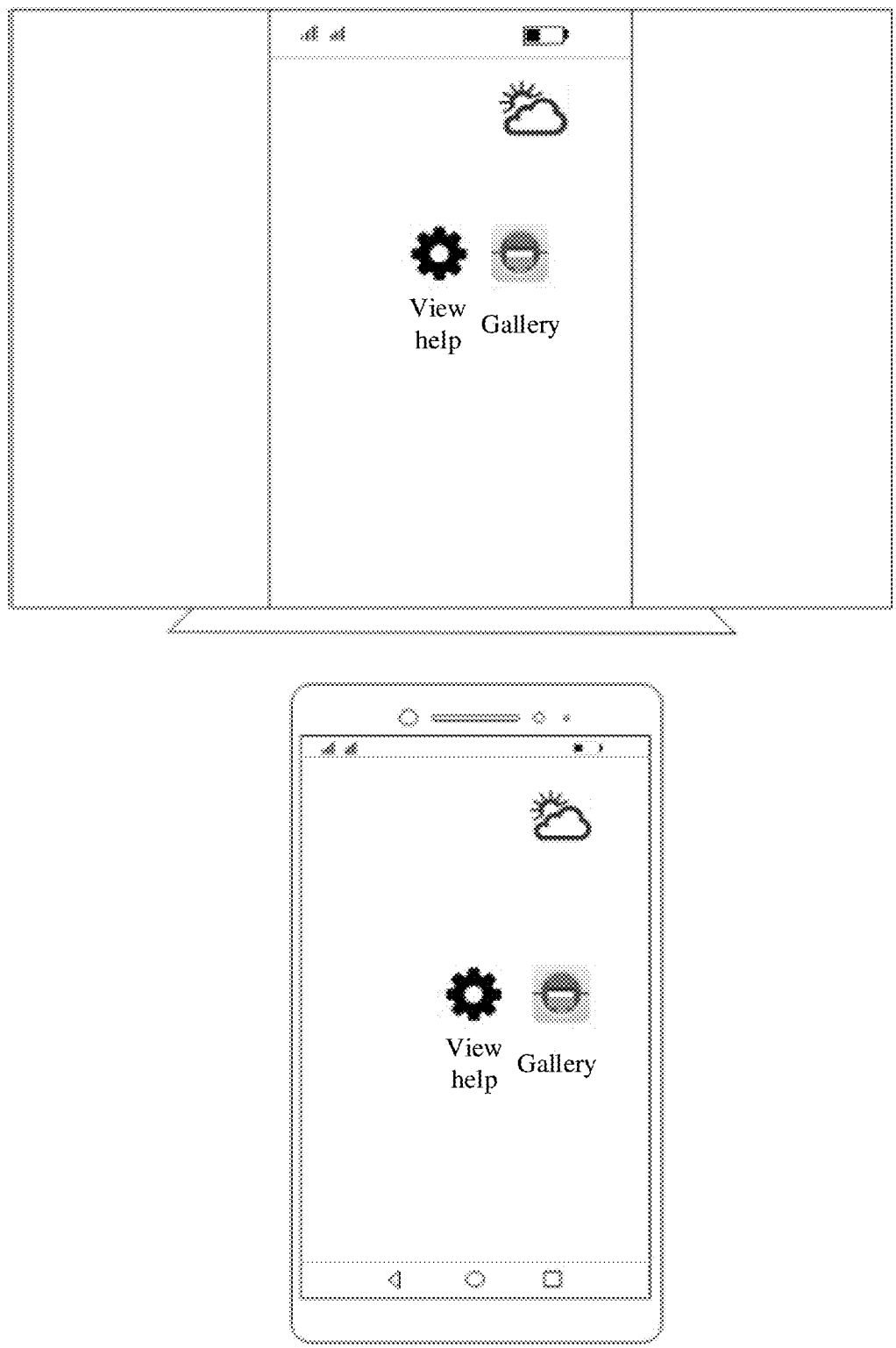
FIG. 15 is a seventh schematic diagram of a screen projection system according to an embodiment of this application.
Figure 16:
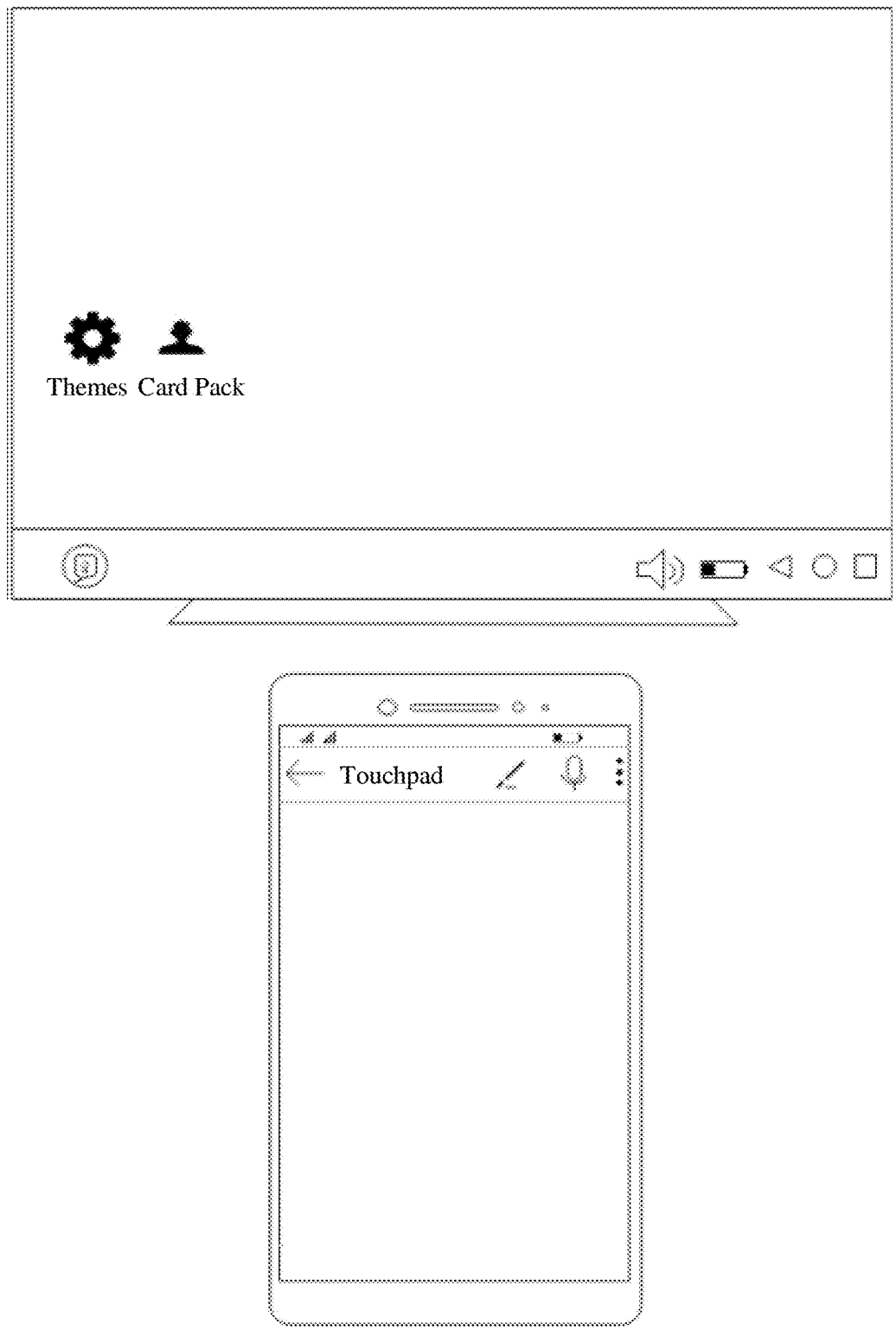
FIG. 16 is an eighth schematic diagram of a screen projection system according to an embodiment of this application.

As shown in FIG. 14, an embodiment of this application further provides another graphical user interface. When a terminal device 100 performs a "one-touch screen projection" function, in response to a drop-down operation of a user on a status bar, a prompt for a screen projection status of the current terminal device 100 may be displayed, information about a current display device for screen projection is displayed, a disconnection function is provided, and two different screen projection modes: computer mode and mobile phone mode may also be provided. Specifically, as shown in FIG. 15, an existing screen projection function is to project content displayed on the terminal device 100 to a display device 200, for example, projecting a desktop. As shown in FIG. 16, when the terminal device receives an operation that a user selects the mobile phone mode, the display device 200 may perform display in computer mode, and the terminal device 100 may function as a touchpad to move or control the display device 200. In some embodiments, after the terminal device 100 completes the screen projection operation, the display device 200 may display the screen of the terminal device 100. Further, the terminal device 100 may be used as a touchpad to receive a trigger operation of a user and control an operation of the display device 200. Specifically, after receiving the trigger operation of the user on the terminal device 100, the display device 200 may complete a corresponding action. For example, the terminal device 100 receives a tap action, and the display device 200 starts the first application program and the like.

Figure 17:
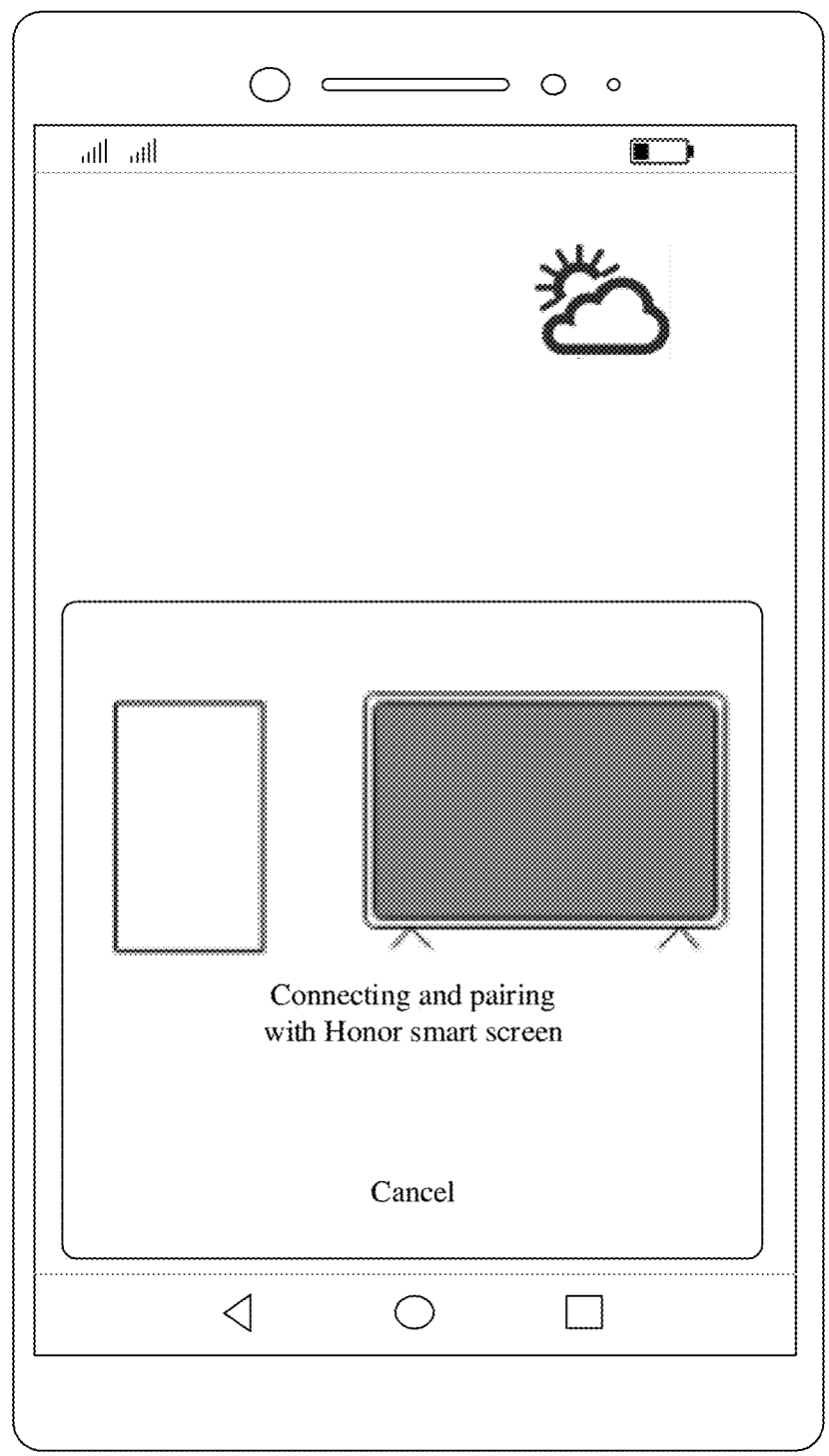
FIG. 17 is a ninth user interface diagram of a screen projection method according to an embodiment of this application.

As shown in FIG. 17, an embodiment of this application further provides another graphical user interface. When a terminal device 100 is being connected to a display device, the graphical user interface may be used to prompt a user and provide a canceling function.

Figure 18:
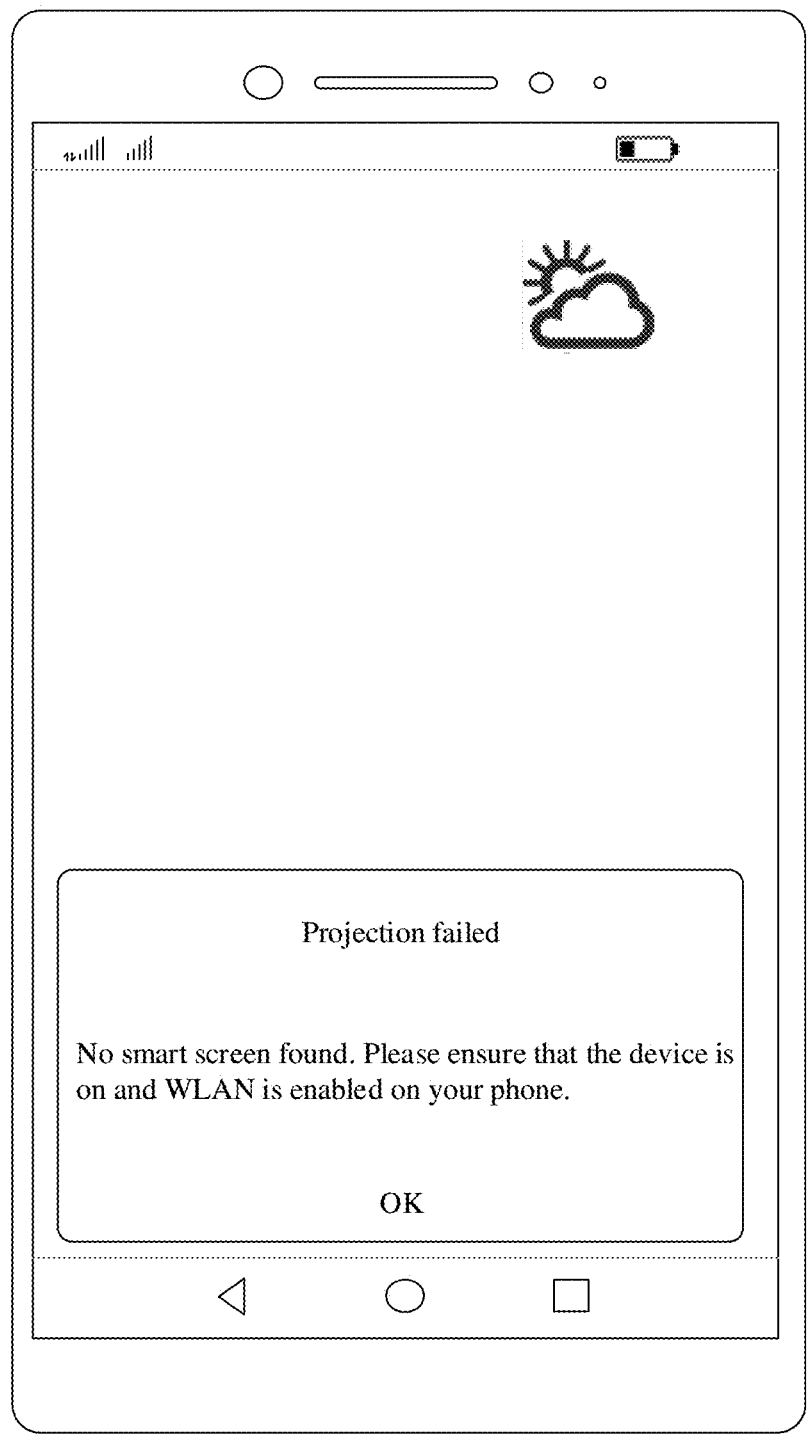
FIG. 18 is a tenth user interface diagram of a screen projection method according to an embodiment of this application.

As shown in FIG. 18, an embodiment of this application may further provide another graphical user interface. When a terminal device 100 fails in screen projection, the terminal device 100 displays a prompt box to inform a user of a failure reason, for example, "No corresponding smart screen has been found. Please ensure that the device is on and WLAN is enabled on your phone".

In some other embodiments, when screen projection fails, the terminal device 100 may alternatively display another prompt box, including prompt information. The prompt information is used to prompt the screen projection failure, and suggest trying to restart the smart screen or the screen projection function and reconnecting, and ensuring that the WLAN function of the mobile phone has been enabled. The prompt box may further include a first option. When receiving a user operation on the first option, the terminal device 100 may stop displaying the prompt box or screen.

Figure 19A:
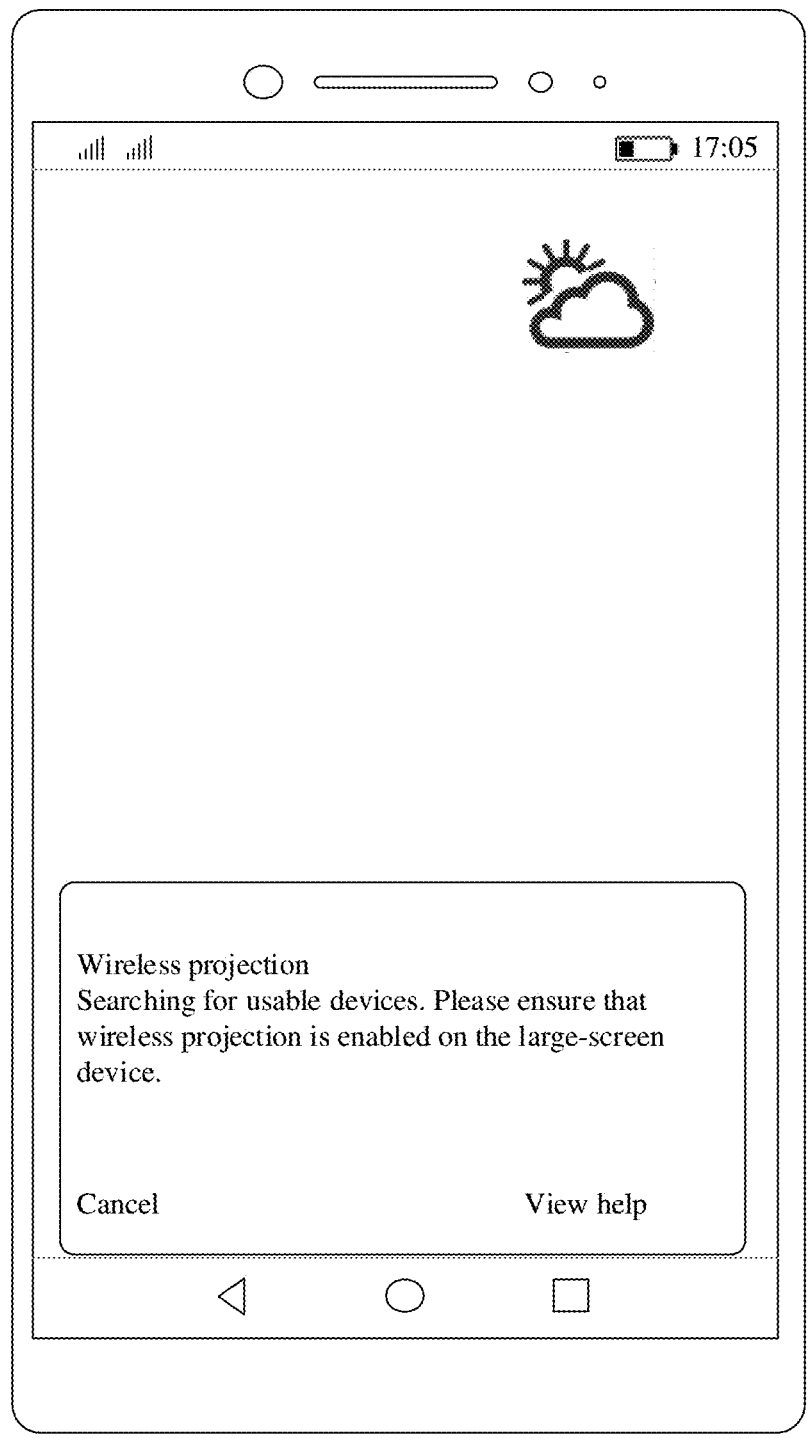
FIG. 19A is an eleventh user interface diagram of a screen projection method according to an embodiment of this application.

As shown in FIG. 19A, an embodiment of this application may further provide another graphical user interface. When a terminal device 100 finds a list of nearby usable display devices, the terminal device 100 may display a current status, for example, "Searching for usable devices.

Please ensure that wireless projection is enabled on the large-screen device", and may further provide an option such as "cancel" or "view help".

Figure 19B:
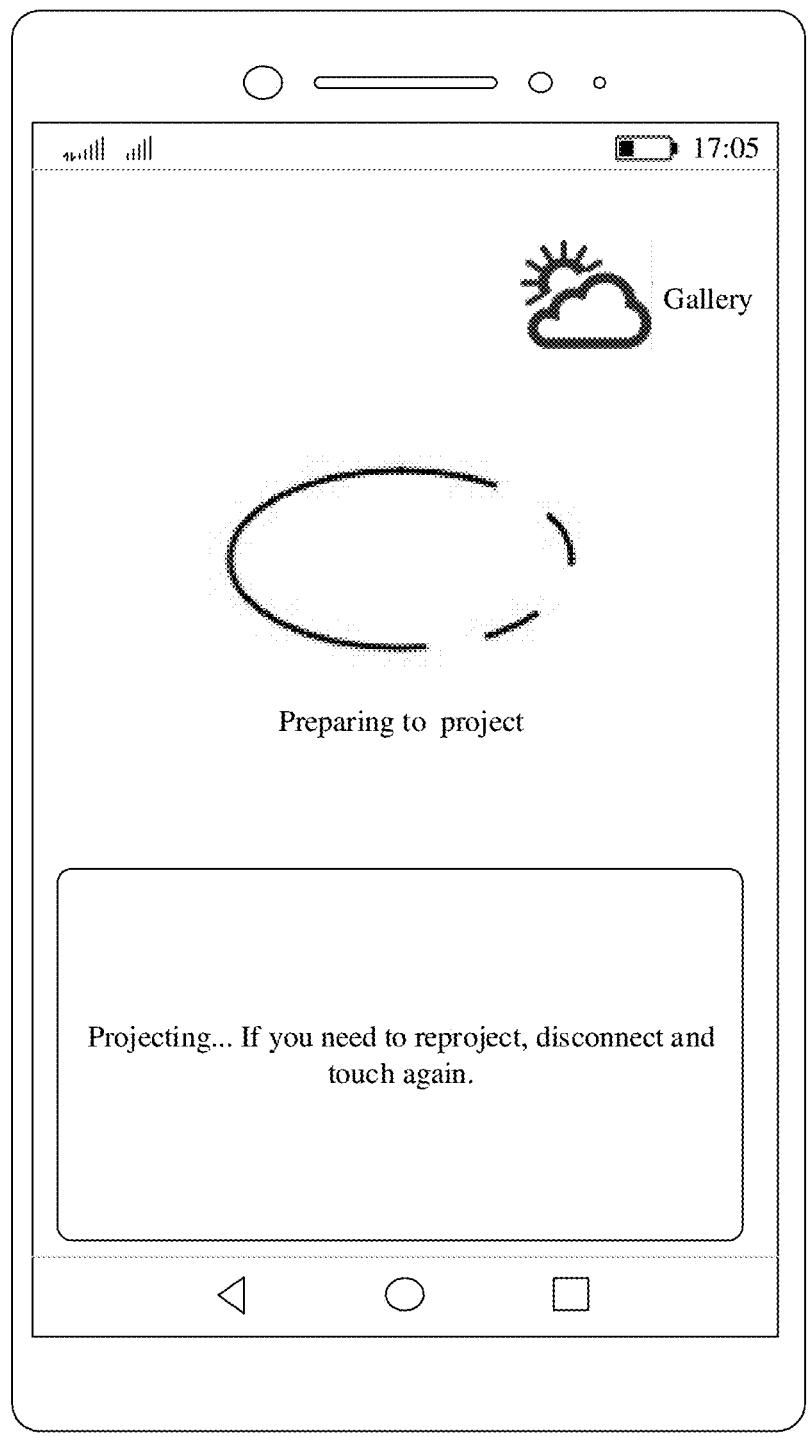
FIG. 19B is a twelfth user interface diagram of a screen projection method according to an embodiment of this application.

As shown in FIG. 19B, an embodiment of this application further provides a graphical user interface. When a terminal device 100 projects a screen on a display device 200, the terminal device 100 may display first prompt information. The prompt information is used to inform a user that "Projecting . . . If you need to reproject, disconnect and touch again." The interface further includes second prompt information. The second prompt information is used to prompt that screen projection preparation is being done.

Figure 20:
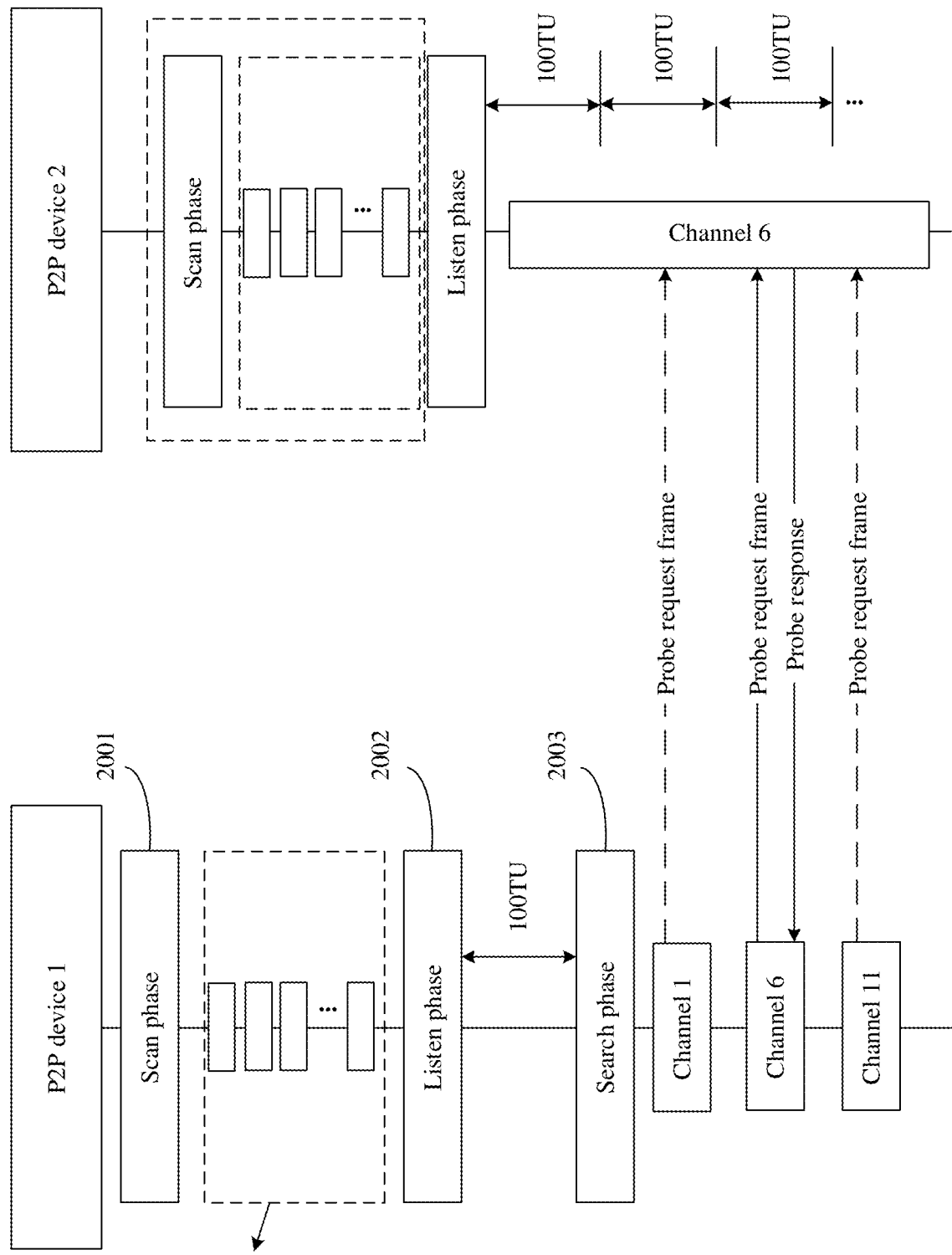
FIG. 20 is a seventh user interface diagram of a screen projection method according to an embodiment of this application.

As shown in FIG. 20, an embodiment of this application provides a P2P-based screen projection procedure.

S2001: A P2P device 1 enters a scan (scan) phase.

Both the P2P device 1 and a P2P device 2 may send out a probe request (probe request) frame in the scan phase. The P2P device 1 and the P2P device 2 may send the probe request frames on all bands they support to search for all surrounding devices or network information. When the P2P device 1 receives a probe response frame after sending the probe request frame on a channel, it means that the P2P device 1 has discovered a sink device, and the P2P device 1 may display information about the device discovered by scanning to a user on a display screen.

It should also be understood that after being powered on, or after detecting that a user taps a Miracast application, the P2P device 2 may alternatively first enter the scan phase. In this embodiment of this application, the P2P device 2 being a large-screen device is used as an example. The P2P device 2 may enter a listen phase after the scan phase ends. Alternatively, when the P2P device 2 is a large-screen device, the scan phase may be skipped, and the P2P device 2 enters a listen phase for continuous listening after being powered on or after a user taps a corresponding P2P application. A large-screen device does not need to project its own screen onto another device, and only another device projects its own screen onto the large-screen device. Therefore, the large-screen device does not need to discover other devices, and therefore may not experience the scan phase, but only experience the listen phase.

It should also be understood that if in the scan phase, the P2P device 1 does not find a sink device, or the P2P device 1 finds a sink device but does not detect a user tap on the sink device, after the scan phase ends, the P2P device 1 may enter a discovery phase. The discovery phase of the P2P device 1 may include a listen (listen) phase and a search (search) phase.

S2002: The P2P device 1 enters the listen phase.

In the listen phase, a P2P protocol also specifies duration of a device being in the listen phase, and the duration is N times of 100 TU, where N is a random positive integer. For example, N may be any integer of 1, 2, and 3. A reason why N is a random positive integer is to prevent the P2P device 1 and the P2P device 2 from entering a listen phase at the same time and entering a search phase at the same time after waiting for a same time, in which case, neither party can process a probe request frame of the other party.

S2003: The P2P device 1 enters the scan phase to perform P2P device scan, and the P2P device 2 stays in the listen phase.

For example, as shown in FIG. 20, if the P2P device 1 only supports the 2.4G band, after entering the scan phase, the P2P device 1 may separately send a probe request frame only on a channel 1, a channel 6, and a channel 11. When the P2P device 1 sends a probe request frame on the channel 6, because the P2P device 2 is listening to the channel 6, after the P2P device 2 receives the probe request frame on the channel 6, the P2P device 2 may send a probe response (probe response) frame to the P2P device 1. After receiving the probe response frame, the P2P device 1 may inform a user of information about the P2P device 2. When the P2P device 1 detects that the user taps the device information of the P2P device 2, the P2P device 1 may connect to the P2P device 2.

It should be understood that in this embodiment of this application, a probe request frame sent by one party may be received by the other party only when two devices are in a same band. Further, a probe request frame sent by one party can be received by the other party only when two devices are in a same band and frequency channel numbers are the same.

In some embodiments, for an operation of establishing a P2P connection through one-touch screen projection in this application, reference may be made to the foregoing P2P connection.

Figure 21:
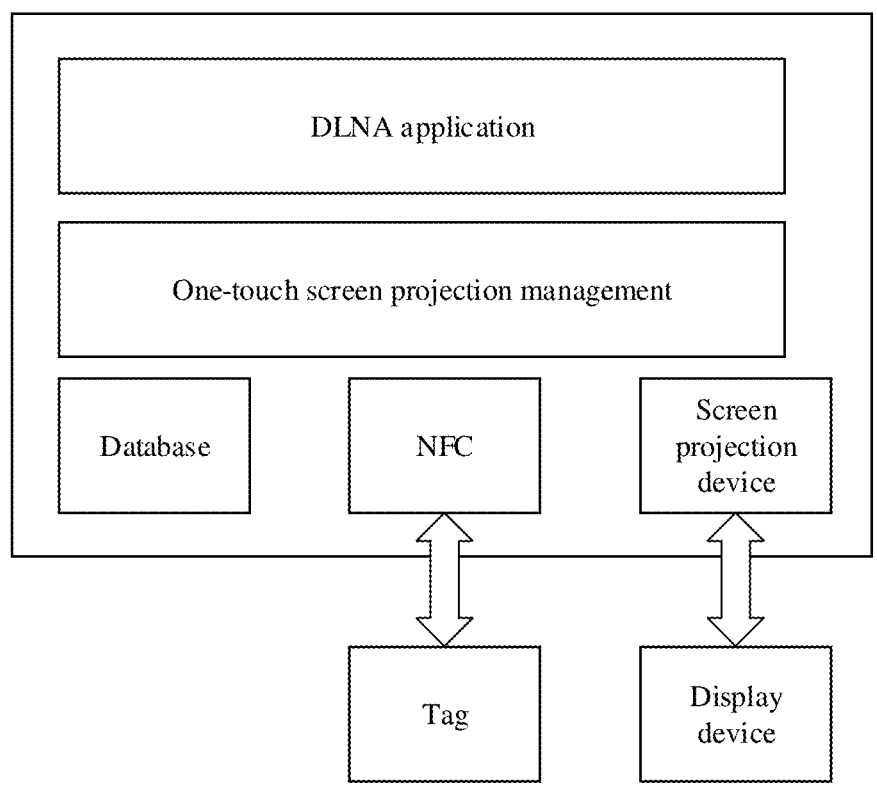
FIG. 21 is a third schematic diagram of a terminal device according to an embodiment of this application.

As shown in FIG. 21, an embodiment of this application further provides a terminal device 100, including a screen projection module, a one-touch screen projection management module, an NFC reading module, a screen projection module, and a database. Specific functions are described in the table.

| Module name | Description |
| --- | --- |
| Application layer module | Upper layer application, used to support completion of an entire DLNA or Miracast application function |
| One-touch screen projection management | Analyzes NFC tag content<br>Updates an NFC tag and a big-screen database<br>Triggers (Miracast and DLNA) scenario recognition and determines whether a scenario is supported |
| NFC reading module | Reads an NFC tag |
| Screen projection module | Provides Miracast and DLNA screen projection functions |
| Database database | Saves detailed information (MAC) of a large screen for non-first-time automatic screen projection, with a unique value of the NFC tag as a key value |

In some embodiments, the foregoing functional modules may complete the screen projection function together with an application processor, an NFC chip, and a memory.

Figure 22:
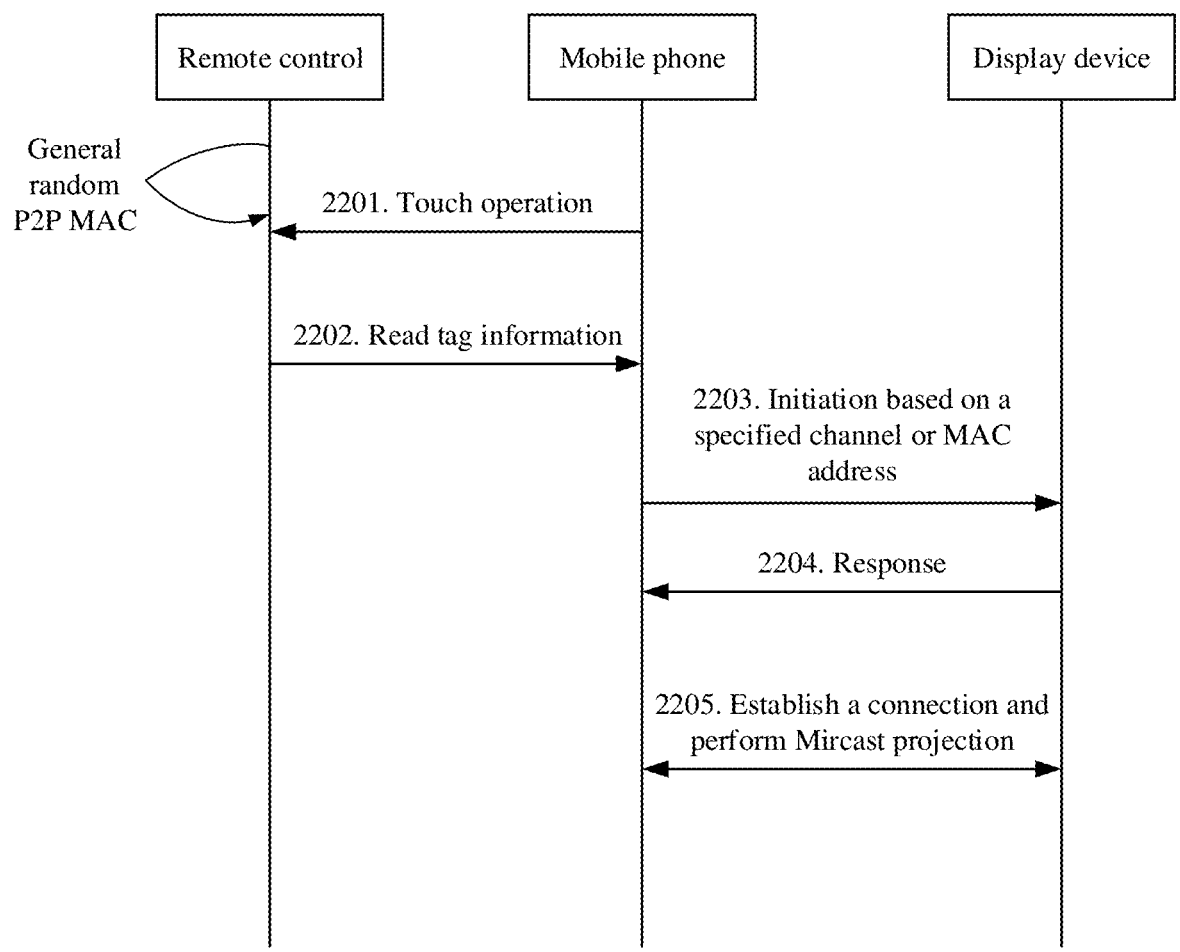
FIG. 22 is a tenth schematic diagram of a terminal device according to an embodiment of this application.

As shown in FIG. 22, an embodiment of this application further provides a "one-touch screen projection" function implemented using a preset MAC address.

An NFC tag is placed inside a remote control 300 coming with a display device 200 (or a "large-screen device"), and a MAC address and identification information of the large-screen device are pre-burned in the tag. When touching the remote control 300, a terminal device 100 may read the tag content, and after identifying the large-screen device, directly initiate a screen projection procedure to a device of the read MAC address. Specific steps are as follows.

Step 2201: The terminal device 100 touches the NFC tag.

The NFC tag includes the MAC address of the corresponding display device. The MAC address may be a MAC address of a P2P connection, and may be randomly generated.

Step 2202: The terminal device 100 obtains tag tag information.

Step 2203: Initiate a designated channel-based or MAC address-based screen projection connection based on the tag information.

Step 2204: Receive a response message from the display device 200.

Step 2205: Establish a P2P connection, and negotiate the Miracast protocol.

Figure 23:
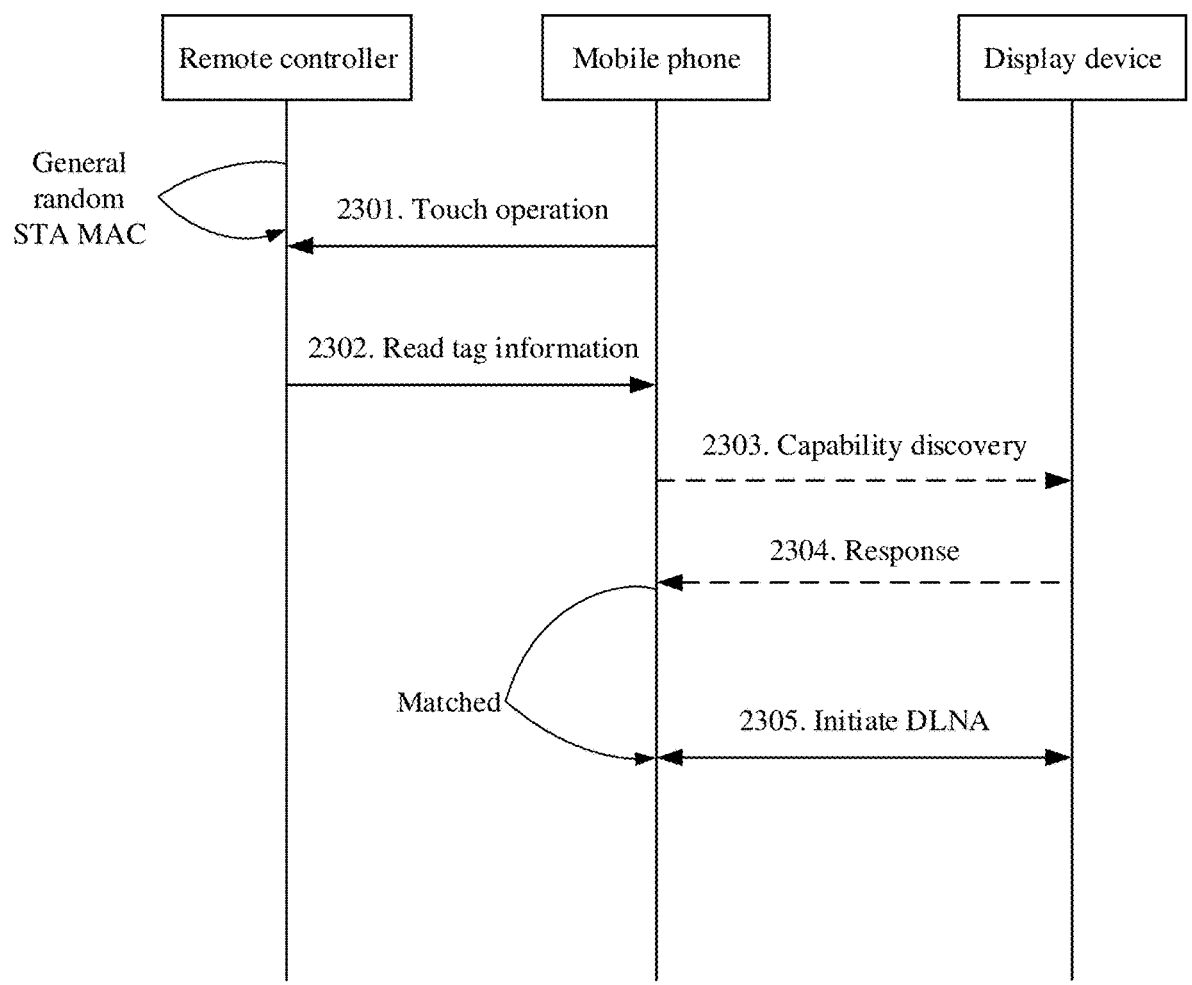
FIG. 23 is an eleventh schematic diagram of a terminal device according to an embodiment of this application.

As shown in FIG. 23, an embodiment of this application further provides a "one-touch screen projection" function implemented using a preset MAC address.

An NFC tag is placed inside a remote control of a large-screen device, and an STA MAC and identification information of the large-screen device are pre-burned in the tag. After a mobile phone touches the remote control, reads tag content, and identifies the large-screen device, it directly initiates a screen projection procedure to a device of the read MAC address. The specific method is as follows.

Step 2301: The terminal device 100 touches the NFC tag.

The NFC tag includes the MAC address of the corresponding display device. The MAC address may be a MAC address of a P2P connection, and may be randomly generated.

Step 2302: The terminal device 100 obtains tag tag information.

Step 2303: The terminal device 100 initiates DLNA capability discovery.

Specifically, the terminal device 100 determines that the display device 200 is of a supported device type based on the tag information. In addition, the terminal device 100 is currently running a video play application, and the video play application has a DLNA capability. That is, the foreground DLNA application triggers a DLNA procedure.

Step 2304: The display device 200 sends a DLNA capability response.

Step 2305: The terminal device 100 determines that the display device 200 is a recorded device and initiates a DLNA procedure.

The terminal device 100 may determine the display device 200 based on the STA MAC address or the NFC tag. The terminal device 100 sends a source address of video content to the display device 200, and the display device 200 obtains the video content from a network based on the source address to implement screen projection.

An embodiment of this application further provides a remote control with an NFC function. The remote control includes a controller and a memory. The memory stores an instruction. When the instruction is executed, the remote control can perform the method in the embodiments of this application.

In some embodiments, the foregoing method may alternatively be performed by an NFC chip. In some embodiments, the remote control stores device information of a paired display device.

An embodiment of this application further provides a display device. The display device includes a memory, a display apparatus, and a controller. The memory stores an instruction. When the instruction is executed, the remote control can perform the method in the embodiments of this application.

The display device may further include a Bluetooth chip or a Wi-Fi chip.

It should be understood that for brevity, descriptions of the embodiments herein focus on emphasizing differences between the embodiments. Therefore, unless explicitly stated in the specification or learned from the context, the embodiments herein may refer to each other.

A person of ordinary skill in the art may be aware that the method steps and units described in the embodiments disclosed in this specification may be implemented by electronic hardware, computer software, or a combination thereof. To clearly describe the interchangeability between hardware and software, the foregoing has generally described steps and compositions of the embodiments by function. Whether the functions are performed by hardware or software depends on particular applications and design constraints of the technical solutions. A person of ordinary skill in the art may use different methods to implement the described functions for each particular application, but it should not be considered that the embodiments go beyond the scope of this application.

A person skilled in the art may clearly understand that, for ease and brevity of description, for specific working processes of the system, apparatus, and unit described above, reference may be made to the corresponding processes in the foregoing method embodiments. Details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or may not be implemented. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, and may be located in one position, or may be distributed on a plurality of network elements. Some or all of the units may be selected depending on an actual requirement, to achieve the objectives of the solutions in the embodiments in this application.

In addition, the functional units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

The foregoing descriptions are merely embodiments of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. A screen projection system, comprising a remote control, a terminal device, and a display device, wherein:
   the terminal device is configured to:
      when the terminal device touches a near field communication (NFC) tag of the remote control, acquire a content of the NFC tag, wherein the content of the NFC tag comprises an identification code of the NFC tag;
      when the terminal device does not have a tag record corresponding to the NFC tag, perform the following:
         display a first pop-up box, wherein the tag record comprises the identification code of the NFC tag, the first pop-up box comprises a display device list, the display device list comprises a first option, and the first option comprises a device name of the display device;
         receive a first operation on the first option by a user;
         in response to the first operation, establish a first screen projection connection with the display device;
         when establishing the first screen projection connection, display a first interface; and save a correspondence between the identification code of the NFC tag and the display device; and when the terminal device has the tag record corresponding to the NFC tag, establish, according to the identification code of the NFC tag, a second screen projection connection with the display device corresponding to the identification code of the NFC tag; and wherein the display device is configured to:
when establishing the first screen projection connection, display a second pop-up box, wherein the second pop-up box comprises prompt information, and the prompt information is used to prompt the terminal device to request to establish a screen projection connection with the display device; and in response to a second operation by a user on the second pop-up box, stop displaying the second pop-up box and display the first interface.

2. The screen projection system according to claim 1, wherein the correspondence comprises a relationship between the identification code of the NFC tag and a media access control (MAC) address of the display device.

3. The screen projection system according to claim 1, wherein the remote control is configured to:
after the second pop-up frame is displayed, receive a second operation input by the user; and
in response to the second operation, send a control instruction to the display device; and
wherein the second pop-up box is stopped displayed by the display device in response to the control instruction, and the first interface is displayed by the display device in response to the control instruction.

4. A terminal device, comprising
one or more displays;
one or more memories; and
one or more processors;
wherein the one or more memories store one or more programs, and when the one or more programs are executed, the terminal device is caused to:
when the terminal device touches a first near field communication (NFC) tag of a first remote control, acquire content of the first NFC tag, wherein the content of the first NFC tag comprises an identification code of the first NFC tag;
when the terminal device does not have a first tag record corresponding to the first NFC tag, perform the following:
display a first pop-up box, wherein the first tag record comprises the identification code of the first NFC tag, the first pop-up box comprises a first display device list, the first display device list comprises a first option, and the first option comprises a device name of a first display device;
receive a first operation on the first option by a user;
in response to the first operation, establish a first screen projection connection with the first display device;
when establishing the first screen projection connection, display a first interface, wherein when the first display device establishes the first screen projection connection with the terminal device, the first display device displays a second pop-up box, the second pop-up box comprises prompt information, and the prompt information is used to prompt the terminal device to request to establish a screen projection connection with the first display device, and wherein the first display device, in response to a second operation by a user on the second pop-up box, stops displaying the second pop-up box and displays the first interface; and save a first correspondence between the identification code of the first NFC tag and the first display device; and when the terminal device has the first tag record corresponding to the first NFC tag, establish, according to the identification code of the first NFC tag, a second screen projection connection with the first display device corresponding to the identification code of the first NFC tag.

5. The terminal device according to claim 4, wherein the first tag record further comprises the first correspondence.

6. The terminal device according to claim 4, wherein the screen projection connection is based on the Miracast protocol or the digital living network alliance (DLNA) protocol.

7. The terminal device according to claim 4, wherein
the content of the first NFC tag further comprises an information corresponding to a first device type; and
when the one or more programs are executed, the terminal device is further caused to:
after acquiring the content of the first NFC tag, determine, according to the information corresponding to the first device type, that the first display device is a display device corresponding to the first device type.

8. The terminal device according to claim 7, wherein when the one or more programs are executed, the terminal device is further caused to:
after acquiring the information corresponding to the first device type and before displaying the first pop-up box, scan for the first display device.

9. The terminal device according to claim 7, wherein the first display device list comprises only display devices corresponding to the first device type.

10. The terminal device according to claim 4, wherein the first correspondence is saved by the terminal device after receiving the first operation on the first option.

11. The terminal device according to claim 4, wherein when the one or more programs are executed, the terminal device is further caused to:
when the terminal device touches a second NFC tag of a second remote control, acquire content of the second NFC tag, wherein the content of the second NFC tag comprises an identification code of the second NFC tag;
when the terminal device does not have a second tag record, display a third pop-up box, wherein the second tag record comprises the identification code of the second NFC tag, the third pop-up box comprises a second display device list, the second display device list comprises a second option, and the second option comprises the device name of a second display device;
receive a third operation on the second option by a user;
in response to the third operation, establish a third screen projection connection with the second display device;
save a second correspondence between the identification code of the second NFC tag and the second display device; and
when the terminal device has the second tag record, establish, according to the identification code of the second NFC tag, a fourth screen projection connection with the second display device corresponding to the identification code of the second NFC tag.

12. The terminal device according to claim 4, wherein when the one or more programs are executed, the terminal device is further caused to:

when the terminal device does not have a Bluetooth function and a wireless local area network (WLAN) function enabled, after the terminal device touches the first NFC tag of the first remote control, turn on the Bluetooth function and the WLAN function.

13. The terminal device according to claim 4, wherein the first display device list is obtained according to Bluetooth or wireless fidelity (Wi-Fi).

14. The terminal device according to claim 4, wherein when the one or more programs are executed, the terminal device is further caused to:
after the terminal device establishes the second screen projection connection with the first display device, display a second interface, wherein the second interface is synchronously displayed on the first display device.

15. The terminal device according to claim 4, wherein when the one or more programs are executed, the terminal device is further caused to:
after the terminal device establishes the first screen projection connection or the second screen projection connection with the first display device, receive a fourth operation to open a first application by a user; and
in response to the fourth operation, display a third interface of the first application, wherein the third interface is synchronously displayed on the first display device.

16. The terminal device according to claim 4, wherein when the one or more programs are executed, the terminal device is further caused to:
when the first screen projection or the second screen projection between the terminal device and the first display device fails, display a fourth pop-up box, and the fourth pop-up box is used to prompt a user that the screen projection fails.

17. The terminal device according to claim 4, wherein when the one or more programs are executed, the terminal device is further caused to:
after the terminal device touches the first NFC tag of the first remote control, display a prompt information indicating that the screen is being projected.

18. The terminal device according to claim 4, wherein when the one or more programs are executed, the terminal device is further caused to:
when the terminal device touches the first NFC tag of the first remote control, output a prompt sound or vibrate.

19. A non-transitory computer-readable storage medium, comprising a computer program, wherein the computer program, when run on a terminal device, causes the terminal device to:
when the terminal device touches a first near field communication (NFC) tag of a first remote control, acquire content of the first NFC tag, where the content of the first NFC tag comprises an identification code of the first NFC tag;
when the terminal device does not have a first tag record corresponding to the first NFC tag, perform the following:
display a first pop-up box, wherein the first tag record comprises the identification code of the first NFC tag, the first pop-up box comprises a first display device list, the first display device list comprises a first option, and the first option comprises a device name of the first display device;
receive a first operation on the first option by a user;
in response to the first operation, establish a first screen projection connection with the first display device;
when establishing the first screen projection connection, display a first interface, wherein when the first display device establishes the first screen projection connection with the terminal device, the first display device displays a second pop-up box, the second pop-up box comprises prompt information, and the prompt information is used to prompt the terminal device to request to establish a screen projection connection with the first display device, and wherein the first display device, in response to a second operation by a user on the second pop-up box, stops displaying the second pop-up box and displays the first interface; and
save a correspondence between the identification code of the first NFC tag and the first display device; and
when the terminal device has the first tag record corresponding to the first NFC tag, establish a second screen projection connection with the first display device corresponding to the identification code of the first NFC tag, according to the identification code of the first NFC tag.

* * * * *